US012476100B2

(12) United States Patent
Kinoshita et al.

(10) Patent No.: US 12,476,100 B2
(45) Date of Patent: Nov. 18, 2025

(54) IONIZATION DEVICE, MASS SPECTROMETRY SYSTEM, AND IONIZATION METHOD

(71) Applicants: BIOCHROMATO, INC., Kanagawa (JP); UNIVERSITY OF YAMANASHI, Yamanashi (JP)

(72) Inventors: Kazumasa Kinoshita, Kanagawa (JP); Takao Nishiguchi, Kanagawa (JP); Tomoaki Endo, Kanagawa (JP); Kenzo Hiraoka, Yamanashi (JP)

(73) Assignees: BIOCHROMATO, INC., Kanagawa (JP); UNIVERSITY OF YAMANASHI, Yamanashi (JP)

( * ) Notice: Subject to any disclaimer, the term of this patent is extended or adjusted under 35 U.S.C. 154(b) by 603 days.

(21) Appl. No.: 17/821,221

(22) Filed: Aug. 22, 2022

(65) Prior Publication Data

US 2023/0187197 A1 Jun. 15, 2023

Related U.S. Application Data

(63) Continuation of application No. PCT/JP2021/003896, filed on Feb. 3, 2021.

(30) Foreign Application Priority Data

Feb. 25, 2020 (JP) ................................ 2020-029310

(51) Int. Cl.
*H01J 49/04* (2006.01)
*H01J 49/16* (2006.01)

(52) U.S. Cl.
CPC ........ *H01J 49/168* (2013.01); *H01J 49/0422* (2013.01)

(58) Field of Classification Search
None
See application file for complete search history.

(56) References Cited

U.S. PATENT DOCUMENTS 5,877,495 A * 3/1999 Takada .................. H01J 49/165 250/288
5,969,351 A * 10/1999 Nabeshima ........... H01J 49/168 250/288

(Continued)

FOREIGN PATENT DOCUMENTS

CN 110289203 B * 3/2021 .............. H01J 49/24
JP H02-135655 5/1990

(Continued)

OTHER PUBLICATIONS

Kenzo Hiraoka, "Gas-phase Ionization Methods Originated from Penning Ionization," J. Mass Spectrom. Soc. Jpm. vol. 65, No. 3, 2017 P107-P112 [Search Nov. 29, 2019] Internet <URL:https://www.jstage.jst.go.jp/article/massspec/65/3/65_S17-08/_pdf>.

(Continued)

*Primary Examiner* — Eliza W Osenbaugh-Stewart
(74) *Attorney, Agent, or Firm* — IPUSA, PLLC

(57) ABSTRACT

An ionization device includes an ion formation section configured to ionize an analyte via a corona discharge; and a transfer section configured to transfer the ionized analyte to a mass spectrometry apparatus. The ion formation section and the transfer section are partitioned by one electrode of a pair of electrodes that generate the corona discharge. The one electrode has an opening.

5 Claims, 28 Drawing Sheets

(56) References Cited

U.S. PATENT DOCUMENTS

| | | | | |
|---|---|---|---|---|
| 6,686,592 | B1 | 2/2004 | Sakairi et al. | |
| 6,943,343 | B2 * | 9/2005 | Honjo | G01N 27/622 250/281 |
| 2002/0190201 | A1 | 12/2002 | Yamada et al. | |
| 2003/0015657 | A1 | 1/2003 | Takada et al. | |
| 2004/0036020 | A1 * | 2/2004 | Sakairi | H01J 49/168 250/288 |
| 2006/0054806 | A1 * | 3/2006 | Yamada | H01J 49/145 250/288 |
| 2014/0299759 | A1 | 10/2014 | Allsworth et al. | |
| 2016/0300703 | A1 | 10/2016 | Hasegawa et al. | |
| 2020/0041471 | A1 * | 2/2020 | Ueda | G01N 30/72 |

FOREIGN PATENT DOCUMENTS

| | | |
|---|---|---|
| JP | 2002-056801 | 2/2002 |
| JP | 2006-086002 | 3/2006 |
| JP | 2012-028157 | 2/2012 |

OTHER PUBLICATIONS

International Search Report of Int. Appl. No. PCT/JP2021/003896 dated Apr. 6, 2021.

Extended European Search Report mailed on Feb. 16, 2024 issued with respect to the corresponding European Patent Application No. 21761256.3.

* cited by examiner

FIG.33

| | | DISTANCE BETWEEN ELECTRODES | | | |
|---|---|---|---|---|---|
| | | STORAGE DISTANCE (0.1 mm) | 1 mm | 2 mm | 3 mm |
| DISCHARGE VOLTAGE | 2.0 kV | CANNOT BE OBSERVED | CANNOT BE OBSERVED | CANNOT BE OBSERVED | CANNOT BE OBSERVED |
| | 2.5 kV | CAN BE OBSERVED | CAN BE OBSERVED | CANNOT ALMOST BE OBSERVED | CANNOT BE OBSERVED |
| | 3.0 kV | CAN BE OBSERVED | CAN BE OBSERVED | CAN BE OBSERVED | CANNOT ALMOST BE OBSERVED |

IONIZATION DEVICE, MASS SPECTROMETRY SYSTEM, AND IONIZATION METHOD

CROSS-REFERENCE TO RELATED APPLICATION

The present application is a continuation application of International Application No. PCT/JP2021/003896, filed Feb. 3, 2021, which claims priority to Japanese Patent Application No. 2020-029310 filed Feb. 25, 2020. The contents of these applications are incorporated herein by reference in their entirety.

BACKGROUND OF THE INVENTION

1. Field of the Invention

The present disclosure relates to an ionization device, a mass spectrometry system, and an ionization method.

2. Description of the Related Art

Kenzo Hiraoka, "Gas-phase Ionization Methods Originated from Penning Ionization," J. Mass Spectrom. Soc. Jpm. Vol. 65, No. 3, 2017 P107-P112 [Search Nov. 29, 2019] Internet <URL:https://www.jstage.jst.go.jp/article/massspec/65/3/65_S17-08/_pdf> discloses an ion source that ionizes an analyte by a mass spectrometry apparatus. The ion source, in which a piston and a solenoid pulse valve that have excellent heat resistance are combined, performs a corona discharge with a discharge needle disposed in an open space of an ion source cell, to ionize a substance, and transfers the ionized substance to a mass spectrometry apparatus.

SUMMARY OF INVENTION

Problem to be Solved by the Invention

However, in the related art shown in Kenzo Hiraoka, "Gas-phase Ionization Methods Originated from Penning Ionization," as shown in FIG. 34, a corona discharge is performed in the open space of the ion source cell, so that the ionized substance is diffused into the open space and an analytical sensitivity of the ionized substance may be lowered.

The present disclosure has been made in view of the above-described problem, and has an object to obtain an ionization device that improves an analytical sensitivity of an ionized substance.

Means for Solving the Problem

According to an aspect of the present disclosure, an ionization device includes an ion formation section configured to ionize an analyte via a corona discharge; and a transfer section configured to transfer the ionized analyte to a mass spectrometry apparatus, the ion formation section and the transfer section being partitioned by one electrode of a pair of electrodes that generate the corona discharge, the one electrode having an opening.

Effects of the Invention

In accordance with the present disclosure, the analytical sensitivity for the ionized substance can be improved.

BRIEF DESCRIPTION OF DRAWINGS

Other objects and further features of the present disclosure will be apparent from the following detailed description when read in conjunction with the accompanying drawings, in which:

FIG. 33 is a diagram illustrating a correspondence relation between the discharge voltage and the distance between electrodes which are set when the ionization process is performed using the ionization device 300 in accordance with the present embodiment.

DESCRIPTION OF THE PREFERRED EMBODIMENT

Figure 1:
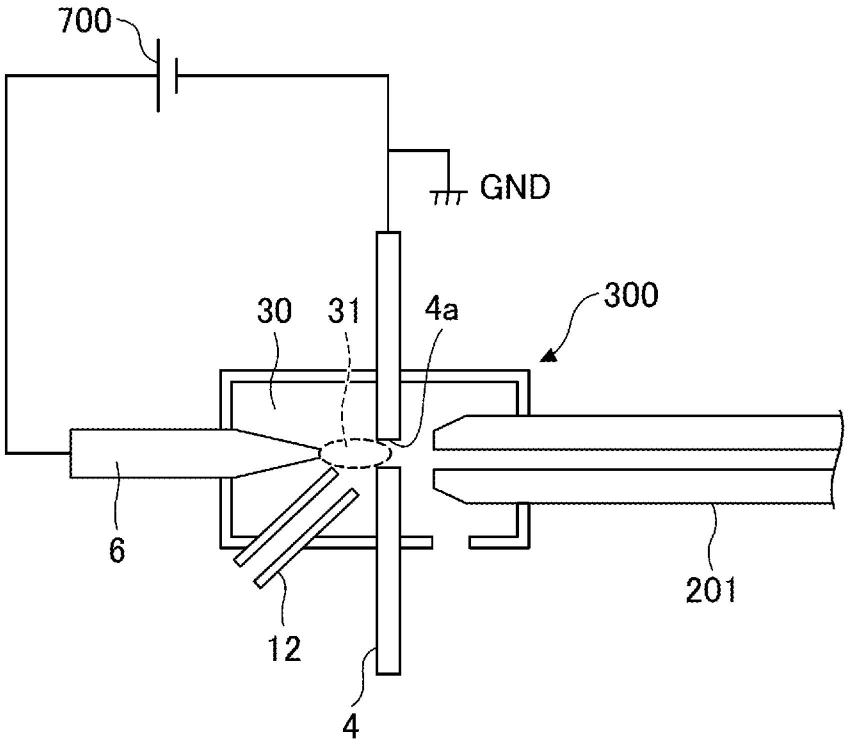
FIG. 1 is a diagram illustrating a schematic configuration of an ionization device 300 according to the present embodiment.

Hereinafter, an embodiment for carrying out the present disclosure will be described with reference to drawings. In the description shown below, a common part in each drawing may be assigned with the same reference numeral, and an explanation thereof may be omitted. Also, for ease of comprehension, the scale of each member in each drawing may differ from the actual scale. An X-axis direction, a Y-axis direction, and a Z-axis direction represent a direction parallel to the X-axis, a direction parallel to the Y-axis, and a direction parallel to the Z-axis. The X-axis direction and the Y-axis direction and the Z-axis direction are orthogonal to each other. Of the X-axis directions, a direction indicated by the arrow shall be a positive X-axis direction, and a direction opposite the direction shall be a negative X-axis direction. Of the Y-axis directions, a direction indicated by the arrow shall be a positive Y-axis direction, and a direction opposite the direction shall be a negative Y-axis direction. Of the Z-axis directions, a direction indicated by the arrow shall be a positive Z-axis direction, and a direction opposite the direction shall be a negative Z-axis direction. The X-axis direction is a lateral width direction when viewed from the front of the ionization device. The Y-axis direction is a height direction of the ionization device. The Z-axis direction is a depth direction of the ionization device.

Figure 2:
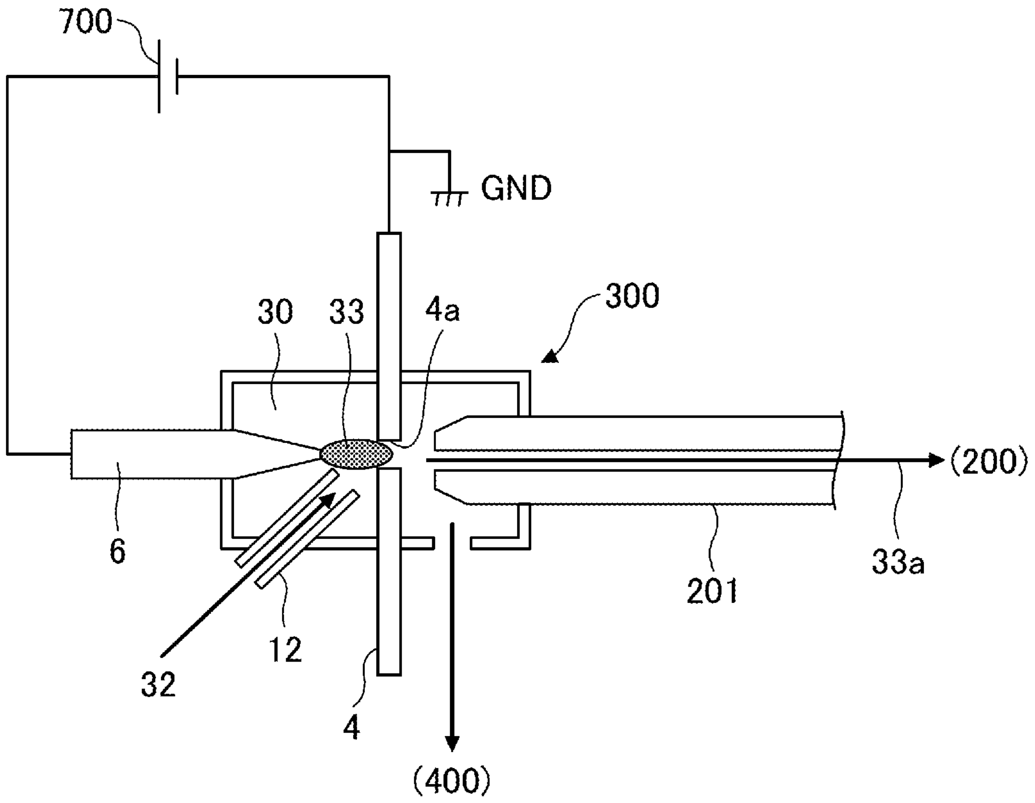
FIG. 2 is a diagram illustrating a state of transferring an ionized substance ionized via a corona discharge in the ionization device shown in FIG. 1 to a mass spectrometry apparatus 200.

FIG. 1 is a diagram illustrating a schematic configuration of the ionization device 300 according to the present embodiment. FIG. 2 is a diagram illustrating a state of transferring an ionized substance via a corona discharge to a mass spectrometry apparatus 200.

Figure 30:
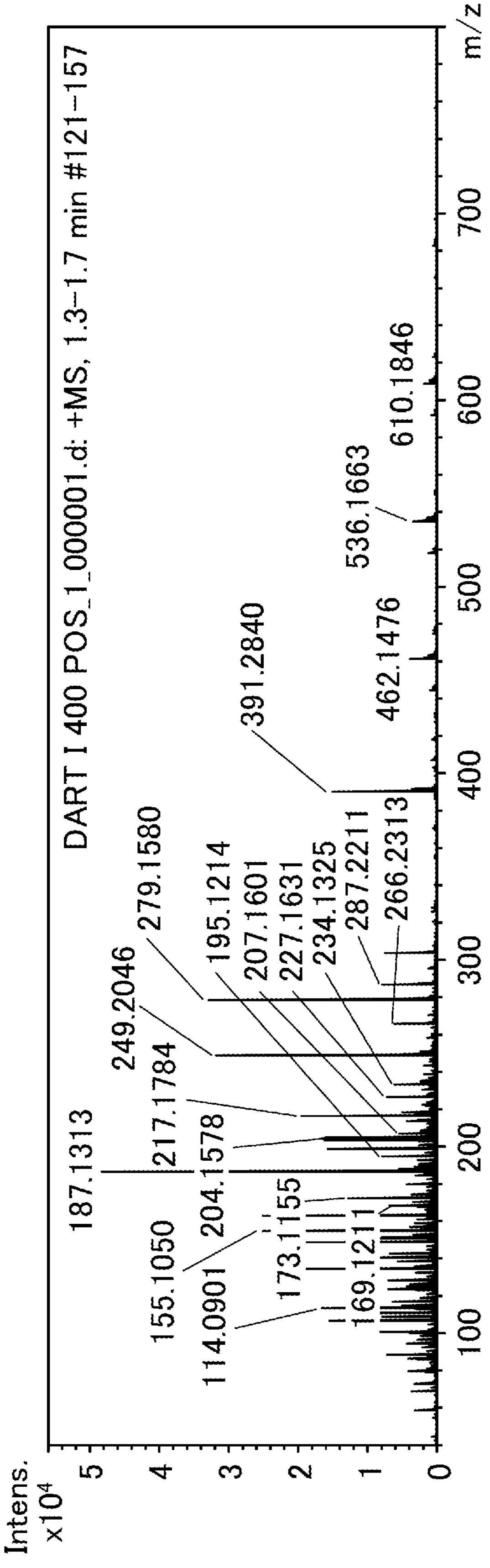
FIG.30 RELATED ART
FIG. 30 is a graphical representation of the mass distribution of ions generated according to the related art.

In FIGS. 1 and 2, 30 is an ion formation section, and the ion formation section (space) is provided with an electrode 6 and an electrode 4 for generating a corona discharge. The discharge electrode 4 has an opening **4*a* and is arranged so that a corona discharge occurs between the electrode 6 and the end portion (edge) of the opening 4*a* of the electrode 4. The hole in the opening 4*a* of the electrode 4 constitutes a transfer section for transferring ionized substances to be measured to the mass spectrometry apparatus 200. The transfer section may be configured by the opening 4*a* of the electrode and a through hole (1*b*) of an insulation plate 1 to be described later. 201 is an ion intake port of the mass spectrometry apparatus 200**.

An ionized analyte (**33*a*) is taken into an analysis apparatus from the ion intake port 201 by a suction device (not shown) provided inside the mass spectrometry apparatus 200**.

An elliptical portion, indicated by 31, represents a corona discharge that occurs in an area where the discharge electrode 6 and the discharge plate 4 are opposite to each other. 33 shows a corona discharge generated. The substance to be measured 32 is supplied near the corona discharge by a tube 12. 700 is a power supply that generates a corona discharge.

Figure 34:
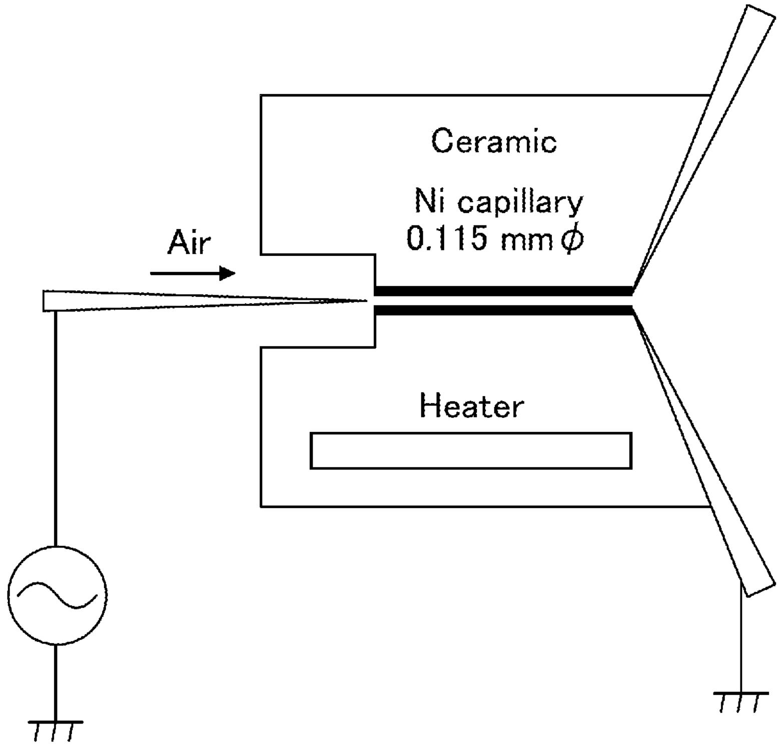
FIG.34 RELATED ART
FIG. 34 is a diagram illustrating an example of the ionization device according to the related art.

In the present embodiment, the ionization device is provided with an electrode that generates a corona discharge, and the corona discharge between the ionization device and a portion of the mass spectrometry apparatus as illustrated in FIG. 34 does not occur, so that the mass spectrometry apparatus is not directly and strongly affected by the corona discharge, and thus the corona discharge does not cause significant damage to the mass spectrometry apparatus leading to a failure or a malfunction.

In addition, the opening **4*a* of the discharge electrode 4 and the ion intake port of the mass spectrometry apparatus 200** can be disposed on a straight line. In addition, the distance between the ion transfer section and the ion intake port of the mass spectrometry apparatus can be shortened. Thus, the ionized substance can be transferred to the mass spectrometry apparatus without being diffused into an open space, thereby improving the analytical sensitivity of the ionized substance.

Figure 3:
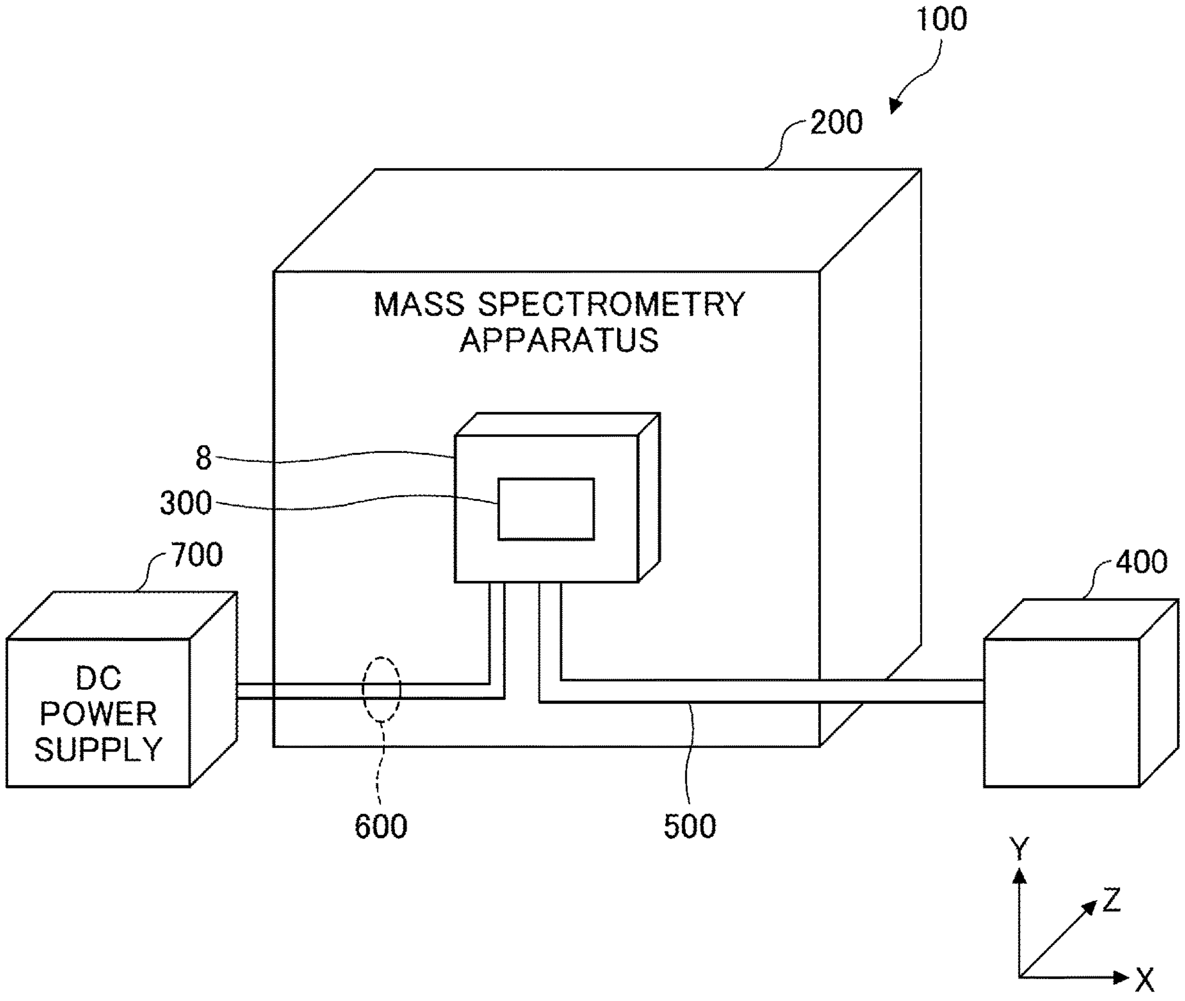
FIG. 3 is a diagram illustrating an overall configuration of a mass spectrometry system 100 provided with the ionization device 300.

FIG. 3 is a diagram illustrating the overall configuration of the mass spectrometry system 100 including the ionization device 300 according to the present embodiment. The mass spectrometry system 100 includes the mass spectrometry apparatus 200, the ionization device 300, a frame 8 for securing the ionization device 300 to the mass spectrometry apparatus 200, a gas suction device 400, such as a vacuum pump, connected to the ionization device 300, and a DC power supply 700. The DC power supply 700 may be, for example, a power supply unit mounted in the mass spectrometry apparatus 200 or a power supply unit different from the power supply unit (a power supply unit independent of the mass spectrometry apparatus 200).

Figure 4:
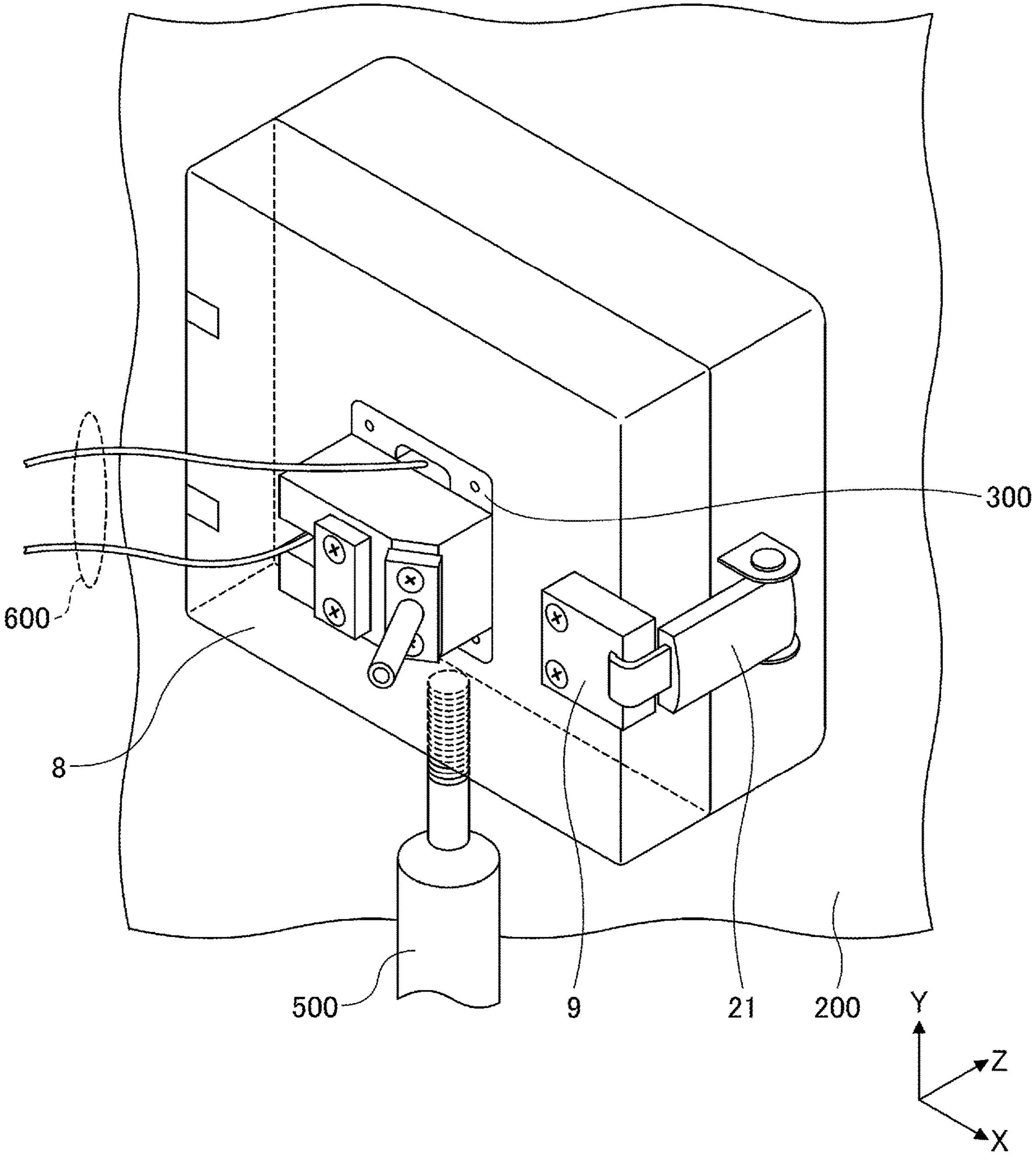
FIG. 4 is a perspective view illustrating a frame 8 and the ionization device 300 provided in the mass spectrometry apparatus 200.

FIG. 4 is a perspective view of the frame 8 and the ionization device 300 which are provided in the mass spectrometry apparatus 200. The frame 8 is disposed in front of the mass spectrometry apparatus 200. The front face of the mass spectrometry apparatus 200 is the same as the end face of the mass spectrometry apparatus 200 in the negative Z-axis direction. The frame 8 is positioned in front of the mass spectrometry apparatus 200, for example, by means of a hinge structure. The mounting structure of the frame 8 to the mass spectrometry apparatus 200 is not limited to the hinge structure, and a screw clamp may be used. A locking block 9 is provided on the frame 8. The locking block 9 is screwed onto the frame 8, for example, at a position close to the end portion of the frame 8 in the positive X-axis direction within the end face of the frame 8 in the negative Z-axis direction.

Figure 5:
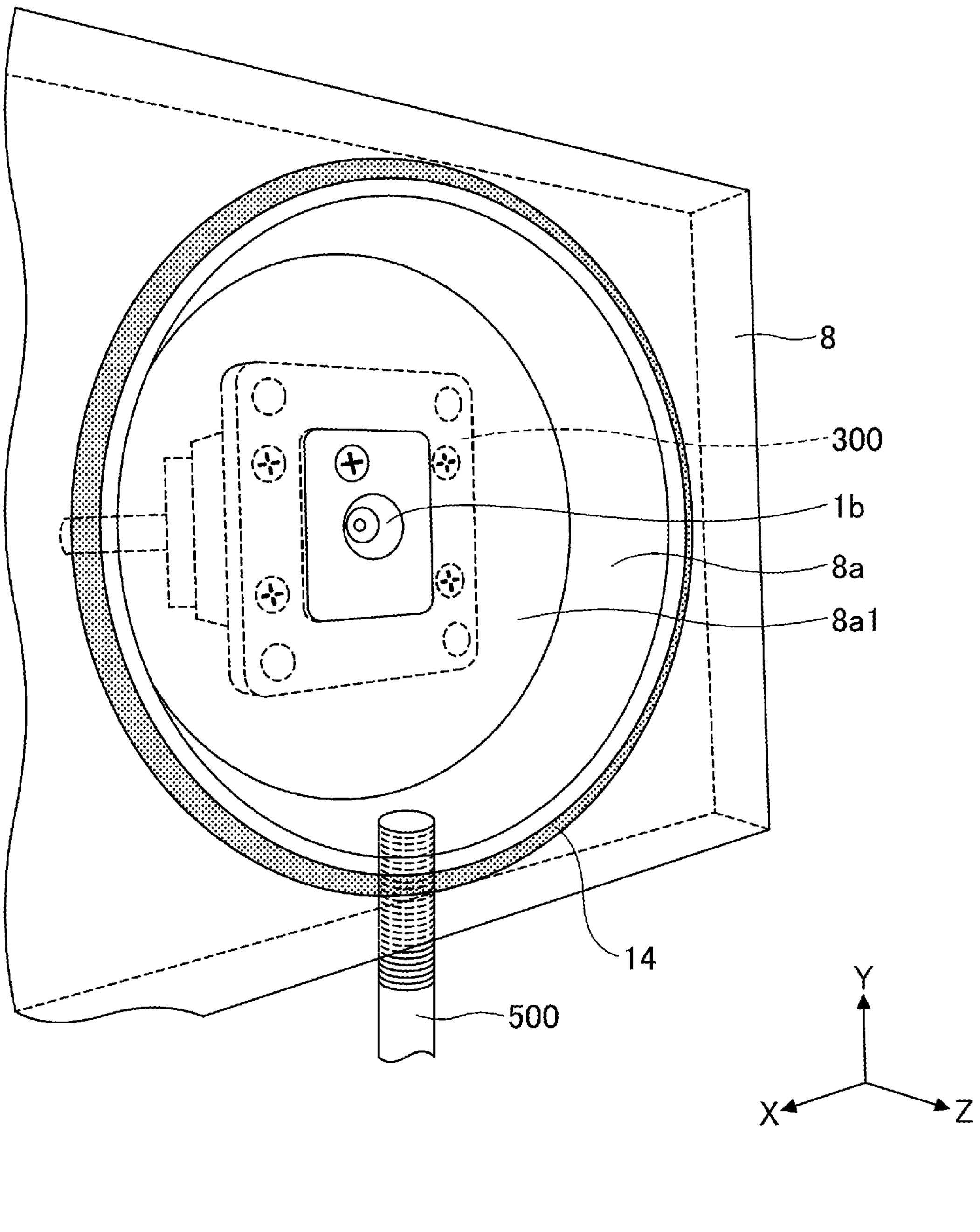
FIG. 5 is a diagram illustrating the frame 8 shown in FIG. 4 viewed from the rear side.

FIG. 5 is a diagram illustrating the frame 8 shown in FIG. 4 viewed from the rear side. A pipe 500 connected to the gas suction device 400 is connected to the end face of the frame 8 in the negative Y-axis direction. The pipe 500 communicates with a concave portion 8*a* formed in the back surface of the frame 8. The back surface of the frame 8 and the end face of the frame 8 in the positive Z-axis direction are one and the same. The ionization device 300 is screwed on the central portion of the bottom portion 8*a*1 of the concave portion 8*a*. A through hole 1*b* is formed in the ionization device 300 to communicate with the concave portion 8*a* in the frame 8. An O-ring 14 is provided to surround the concave portion 8*a* of the frame 8.

Figure 6:
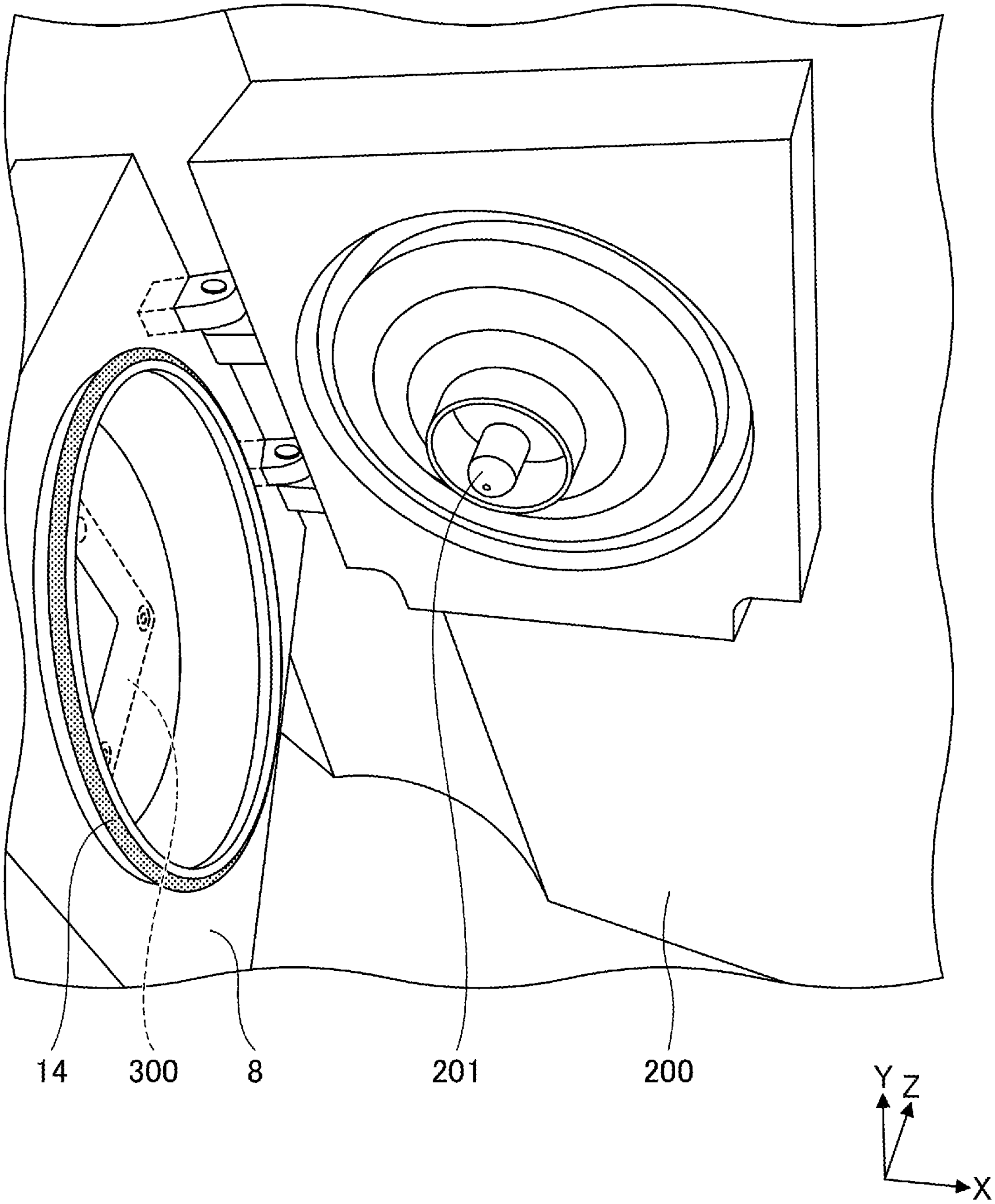
FIG. 6 is a diagram illustrating the frame 8 mounted to the mass spectrometry apparatus 200 by a hinge structure in an openable/closable manner and an ion intake port 201 provided in the mass spectrometry apparatus 200.

FIG. 6 is a diagram illustrating the frame 8 mounted to the mass spectrometry apparatus 200 by a hinge structure in an openable/closable manner and an ion intake port 201 provided to the mass spectrometry apparatus 200. As shown in FIG. 6, an end of the ion intake port 201 is provided in front of the mass spectrometry apparatus 200. When the frame 8 is arranged to cover the ion intake port 201 and the stopper 21 is moored to the locking block 9 described above, the frame 8 is fixed to the mass spectrometry apparatus 200 with the end of the ion intake port 201 facing the through hole 1*b* of the ionization device 300 (see FIG. 4). At this stage, when the O-ring 14 shown in FIG. 6 comes into close contact with the front face of the mass spectrometry apparatus 200, a sealed space is formed between the concave portion 8*a* of the frame 8 and the mass spectrometry apparatus 200.

Next, the structure of the frame 8 and the ionization device 300 will be described in detail with reference to FIGS. 7 to 22.

Figure 7:
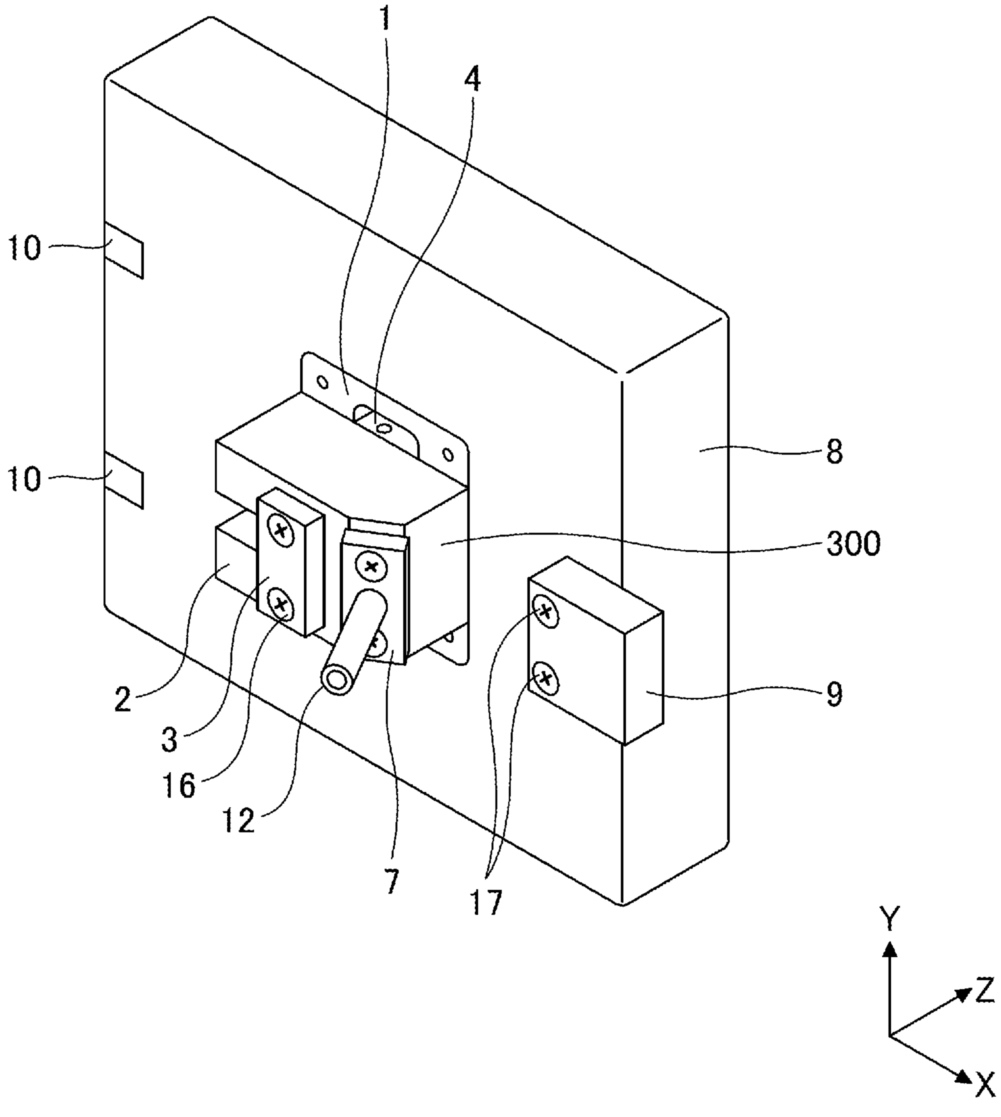
FIG. 7 is a perspective view illustrating the ionization device 300 provided to the frame 8.
Figure 8:
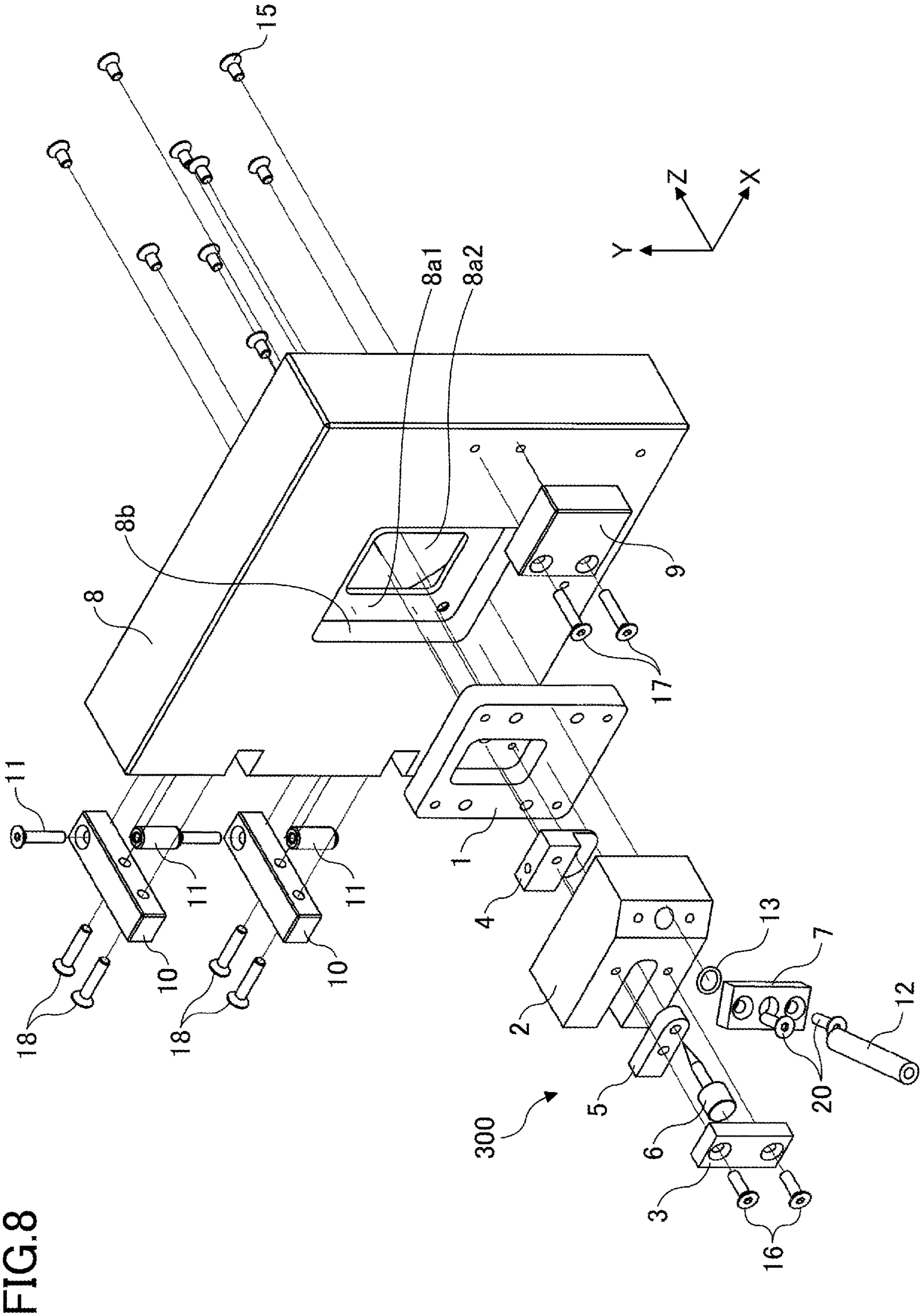
FIG. 8 is an exploded perspective view illustrating the frame 8 and the ionization device 300.

FIG. 7 is a perspective view illustrating the ionization device 300 provided to the frame 8. FIG. 7 shows a state in which a plurality of components configuring the frame 8 are assembled to the ionization device 300. FIG. 8 is an exploded perspective view illustrating the frame 8 and the ionization device 300. As shown in FIG. 8, the ionization device 300 includes an insulation plate 1, a discharge plate 4, an insulation plate 2, a discharge plate 5, a discharge electrode 6, an insulation plate 3, a packing plate 7, and a tube 12.

The insulation plate 2 is a first insulation section. The discharge electrode 6 is a first electrode provided on the insulation plate 2. The insulation plate 1 is a second insulation section provided between the insulation plate 2 and the mass spectrometry apparatus 200. The discharge plate 4 is a second electrode provided on the insulation plate 1 at a distance (e.g., 1.5 mm) from the discharge electrode 6 and grounded.

Figure 9:
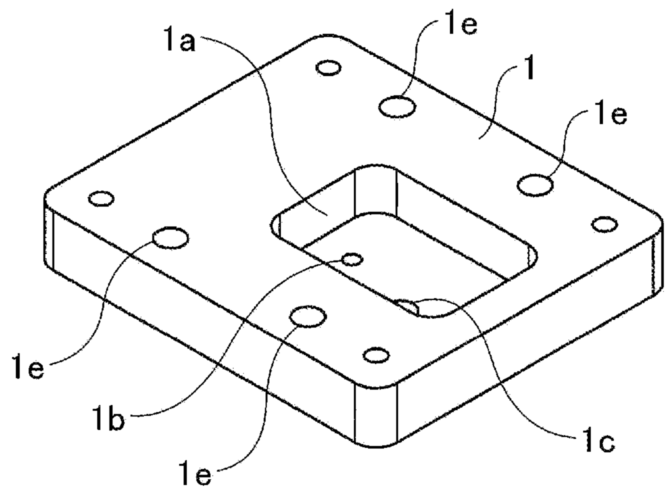
FIG. 9 is a perspective view illustrating an insulation plate 1.
Figure 10:
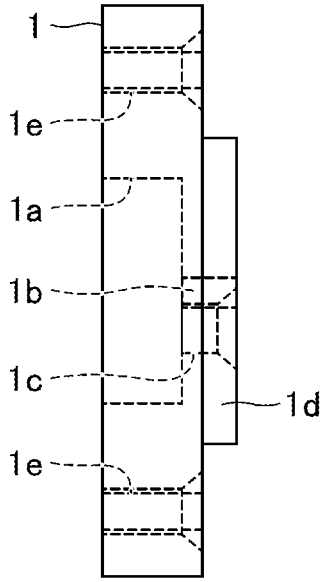
FIG. 10 is a side view illustrating the insulation plate 1 viewed in a positive Y-axis direction.
Figure 11:
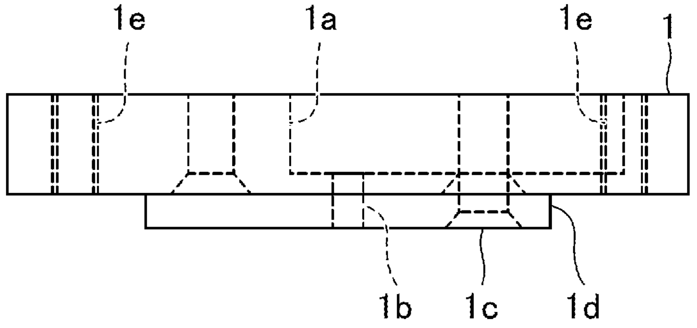
FIG. 11 is a side view illustrating the insulation plate 1 viewed in a negative X-axis direction.

FIG. 9 is a perspective view illustrating the insulation plate 1. FIG. 10 is a side view illustrating the insulation plate 1 viewed in the positive Y-axis direction. FIG. 11 is a side view illustrating the insulation plate 1 viewed in the negative X-axis direction.

The insulation plate 1 is an insulating member formed so as to be capable of being fitted into the concave portion 8*b* of the frame 8. The material of the insulation plate 1 is, for example, PTFE (polytetrafluoroethylene). It should be noted that the material of the insulation plate 1 is not limited to the PTFE, and may be, for example, a fluorine-based binder such as PVDF (polyvinylidene fluoride), EPBR (ethylene-propylene-butadiene rubber), SBR (styrene-butadiene rubber), or CMC (isoprene rubber, carboxymethylcellulose). The material may include a PP (polypropylene) or nylon-based insulating resin. One type of the material may be used alone, or two or more types of the materials may be used in combination.

In the insulation plate 1, a concave portion 1*a*, a through hole 1*b*, a screw hole 1*c*, a convex portion 1*d*, and a plurality of screw holes 1*e* are formed.

The concave portion 1*a* is a depression formed in the end face of the insulation plate 1 in the negative Z-axis direction. The discharge plate 4 shown in FIG. 8 is fitted into the concave portion 1*a*.

The through hole 1*b* has a function of transferring a substance to be ionized to the mass spectrometry apparatus 200. The substance to be ionized is a substance ionized in a space including an area where the discharge electrode 6 and the discharge plate 4 are opposite to each other via a corona discharge occurring between the discharge electrode 6 and the discharge plate 4. The space including the area where the discharge electrode 6 and the discharge plate 4 are opposite to each other will be described in detail later.

The screw hole 1*c* is a hole into which a fastener member (e.g., a screw 15 shown in FIG. 8) for securing the discharge plate 4 to the insulation plate 1 is inserted.

The convex portion 1*d* is formed on the end face of the insulation plate 1 in the positive Z-axis direction, and is also formed with a dimension so as to be capable of being fitted into the opening 8*a*2 of the frame 8 without any clearance.

The screw holes 1*e* are holes into which a plurality of fastener members (e.g., screws 15 shown in FIG. 8) are inserted for securing the insulation plate 1 to the frame 8.

When the insulation plate 1 is secured to the frame 8, the convex portion 1*d* of the insulation plate 1 is inserted into the opening 8*a*2 and the insulation plate 1 is fitted into the concave portion 8*b* of the frame 8. Thereafter, the insulation plate 1 is secured to the frame 8 by screwing the plurality of screws 15 through the bottom portion 8*a*1 of the frame 8 into the screw holes 1*e* of the insulation plate 1.

Figure 12:
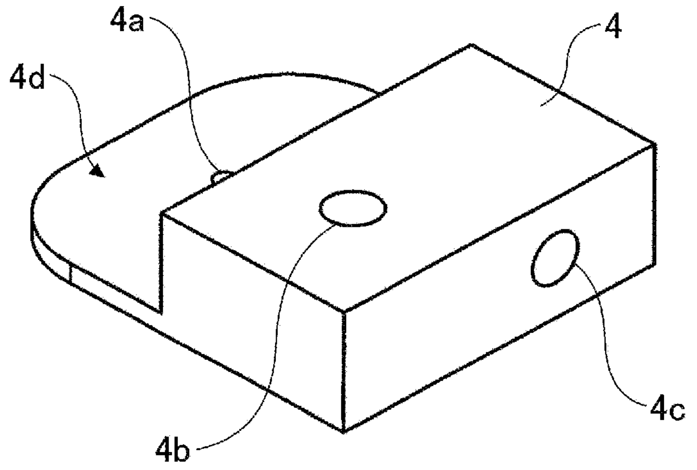
FIG. 12 is a perspective view illustrating a discharge plate 4.
Figure 13:
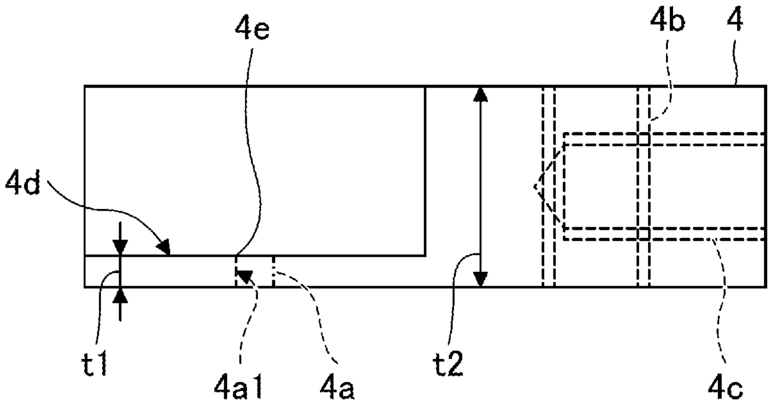
FIG. 13 is a side view of the discharge plate 4 viewed from the negative X-axis direction.

FIG. 12 is a perspective view illustrating the discharge plate 4. FIG. 13 is a side view of the discharge plate 4 viewed from the negative X-axis direction. The discharge plate 4 is an electrically conductive member that is fitted into the concave portion 1*a* of the insulation plate 1 and is connected to the negative electrode of, for example, the DC power supply 700 shown in FIG. 3. The material of the discharge plate 4 is, for example, SUS304, which is an austenitic stainless steel alloy. The material of the discharge plate 4 is not limited to the SUS304, and may be SUS303, a ferritic stainless steel alloy, a titanium-based alloy, an aluminum alloy, a copper alloy, cast iron, steel, an iron alloy, or the like. The ferritic stainless alloy includes SUS430 or the like. The aluminum alloy includes A6063, A5056, or the like. The copper alloy includes chromium copper, beryllium copper, or the like. The cast iron includes gray cast iron represented by FC200, spherical graphite cast iron represented by FCD400, or the like. The steel includes carbon steel represented by SC450, carbon steel pipe material for mechanical structure represented by STKM, or the like. The iron alloy includes chromium-molybdenum steel represented by SCM, or the like.

The discharge plate 4 may be a conductive material or a non-conductive material, or a conductive plating may be formed on the surface of the discharge plate 4. The plating material may be, for example, carbon, a titanium coating, or a non-conductive material mixed with a conductive material.

In the discharge plate 4, a screw hole 4*b*, a screw hole 4*c*, and a through hole 4*a* are formed.

The screw hole 4*b* is inserted with the screw 15 described above. Thus, the discharge plate 4 is fixed to the insulation plate 1.

The screw hole 4*c* is inserted with a screw for securing a conductive terminal provided at an end of a wiring 600 connected to the negative electrode of, for example, the DC power supply 700 shown in FIG. 3. This screw is screwed into the screw hole 4*c* in the discharge plate 4 so that the negative electrode of the DC power supply 700 is electrically connected to the discharge plate 4.

The through hole 4*a* is a hole that penetrates the discharge plate 4 in the Z-axis direction and has a function of transferring the ionized substance to the mass spectrometry apparatus 200. A first thickness t1 of the part of the discharge plate 4 in which the through hole 4*a* is formed in the Z-axis direction is thinner than a second thickness t2 of the part of the discharge plate 4 in which the screw hole 4*b* is formed in the Z-axis direction. The first thickness t1 is, for example, 0.8 to 1.2 mm, and the second thickness t2 is, for example, 5.0 to 7.0 mm. By configuring the discharge plate 4 as described above, when the discharge plate 4 is fitted into the concave portion 1*a* of the insulation plate 1, an end of a discharge needle of the discharge electrode 6 can be disposed close to the through hole 4*a* of the discharge plate 4, and a space including an area where the discharge electrode 6 and the discharge plate 4 are opposite to each other can be provided.

The corner portion 4*e* of the through hole 4*a* functions as a discharge electrode of the discharge plate 4. The corner portion 4*e* is a part where the end face 4*d* of the discharge plate 4 in the negative Z-axis direction intersects with a wall surface 4*a*1 forming the through hole 4*a*.

Figure 14:
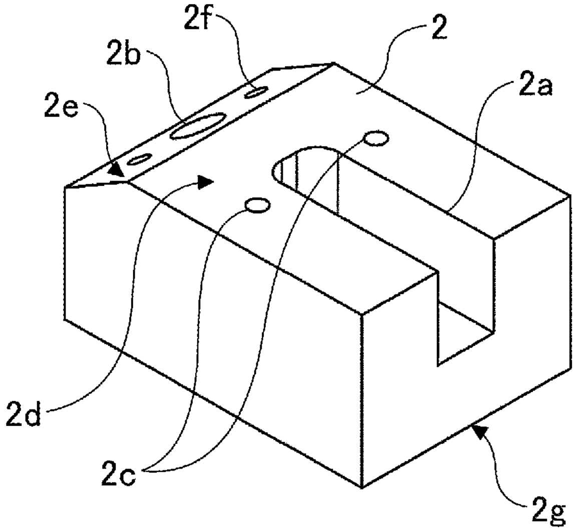
FIG. 14 is a perspective view illustrating an insulation plate 2.
Figure 15:
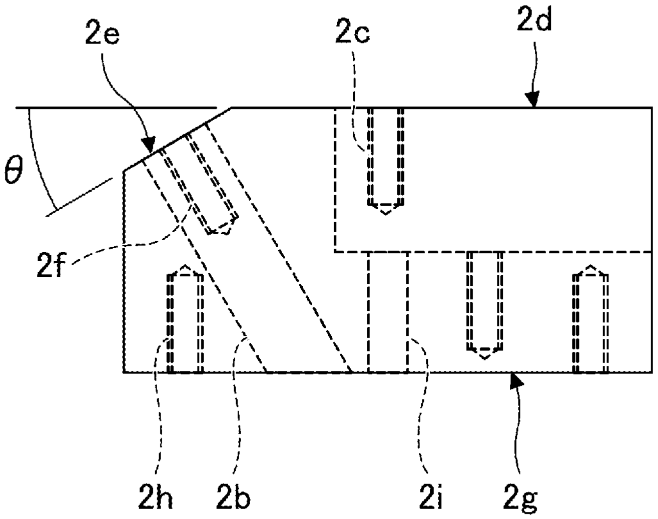
FIG. 15 is a side view illustrating the insulation plate 2 viewed in a negative Y-axis direction.

FIG. 14 is a perspective view illustrating the insulation plate 2. FIG. 15 is a side view of the insulation plate 2 viewed in the negative Y-axis direction. The insulation plate 2 is an insulating member fixed to the end face of the insulation plate 1 in the negative Z-axis direction so as to hold the discharge plate 4. The material of the insulation plate 2 is, for example, PTFE. The material of the insulation plate 2 is not limited to the PTFE, and may be, for example, a fluorine-based binder such as PVDF, EPBR, SBR, or CMC. One type of the material may be used alone, or two or more types of the materials may be used in combination.

In the insulation plate 2, a concave portion 2*a*, a through hole 2*b*, a screw hole 2*c*, a screw hole 2*f*, a screw hole 2*h*, and a through hole 2*i* are formed.

The concave portion 2*a* is a depression formed in the end face 2*d* in the negative Z-axis direction of the insulation plate 2 so as to be capable of accommodating the discharge plate 5 and the discharge electrode 6. A through hole 2*i* is formed in the bottom surface of the concave portion 2*a* in the positive Z-axis direction penetrating from the bottom surface of the concave portion 2*a* to the end face 2*g* of the insulation plate 2 in the positive Z-axis direction. The through hole 2*i* is a hole for inserting the discharge needle of the discharge electrode 6.

Two screw holes 2*c* are formed in the end face 2*d* in the negative Z-axis direction of the insulation plate 2. The two screw holes 2*c* are arranged apart in the Y-axis direction so as to hold the concave portion 2*a*.

A through hole 2*b* is formed for inserting the tube 12 from an inclined surface 2*e* of the insulation plate 2 toward the end face 2*g* in the positive Z-axis direction of the insulation plate 2.

The tube 12 is a tubular member made of ceramics, for example, for introducing an analyte by the mass spectrometry apparatus 200 into the space including the area where the discharge electrode 6 and the discharge plate 4 are opposite to each other. The tube 12 is inserted into the through hole 2*b* of the insulation plate 2 through the packing plate 7 which is screwed onto the inclined surface 2*e* of the insulation plate 2.

The packing plate 7 is screwed onto the inclined surface 2*e* of the insulation plate 2 by screwing the screw 20 shown in FIG. 8 into the screw hole 2*f* of the inclined surface 2*e* of the insulation plate 2. An inclination angle θ (FIG. 15) of the inclined surface 2*e* relative to the plane parallel to the end face 2*d* is preferably 25° to 35°, for example, 30°.

The O-ring 13 shown in FIG. 8 is preferably provided between the packing plate 7 and the inclined surface 2*e* of the insulation plate 2. By providing the O-ring 13, the airtightness between the through hole 2*b* of the insulation plate 2 and the tube 12 increases.

The screw hole 2*h* is a hole in which a fastener member (e.g., screw 15 shown in FIG. 8) for securing the insulation plate 2 to the insulation plate 2 is screwed.

Figure 16:
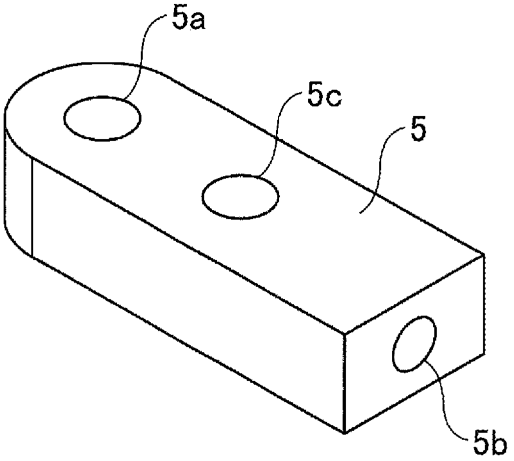
FIG. 16 is a perspective view illustrating a discharge plate 5.
Figure 17:
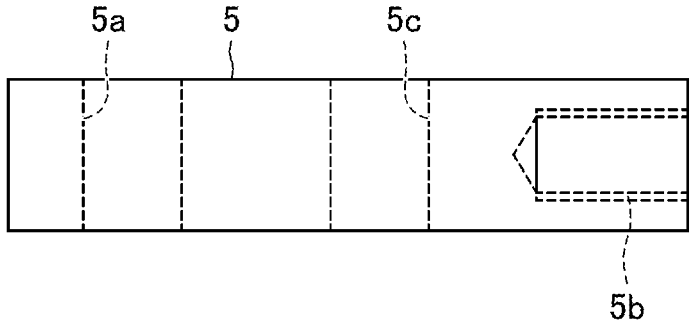
FIG. 17 is a diagram depicting a side surface of the discharge plate 5 viewed in the positive Y-axis direction.

FIG. 16 is a perspective view illustrating the discharge plate 5. FIG. 17 is a side view of the discharge plate 5 viewed in the positive Y-axis direction. The discharge plate 5 is an electrically conductive member that is fitted into the concave portion 2*a* of the insulation plate 2 and is formed with a dimension so as to be capable of holding the discharge needle of the discharge electrode 6. The material of the discharge plate 5 is, for example, SUS304. The material of the discharge plate 5 is not limited to the SUS304, and may be SUS303, SUS430, or the above-described aluminum alloy, copper alloy, cast iron, steel, or iron alloy.

In the discharge plate 5, a through hole 5*a*, a screw hole 5*b*, and a screw hole 5*c* are formed.

The through hole 5*a* is a hole that penetrates the discharge plate 5 in the Z-axis direction so that the discharge needle of the discharge electrode 6 can be inserted.

The screw hole 5*b* is inserted with a screw for securing a conductive terminal provided at an end of a wiring 600 connected, for example, to the positive electrode of the DC power supply 700 shown in FIG. 3. This screw is screwed into the screw hole 5*b* of the discharge plate 5 so that the positive electrode of the DC power supply 700 is electrically connected to the discharge plate 5. The screw hole 5*c* is a hole for inserting a screw for securing the discharge plate 5 to the insulation plate 2.

Figure 18:
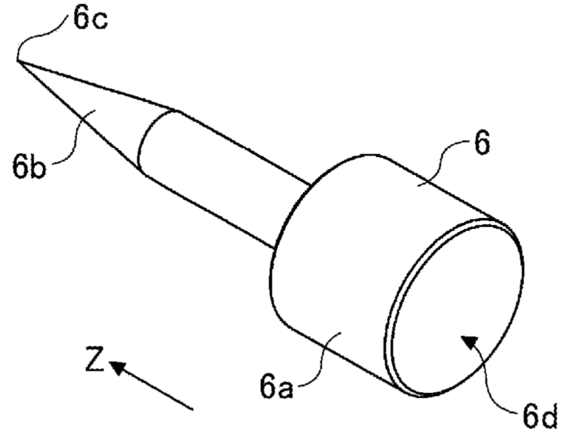
FIG. 18 is a perspective view illustrating a discharge electrode 6.
Figure 19:
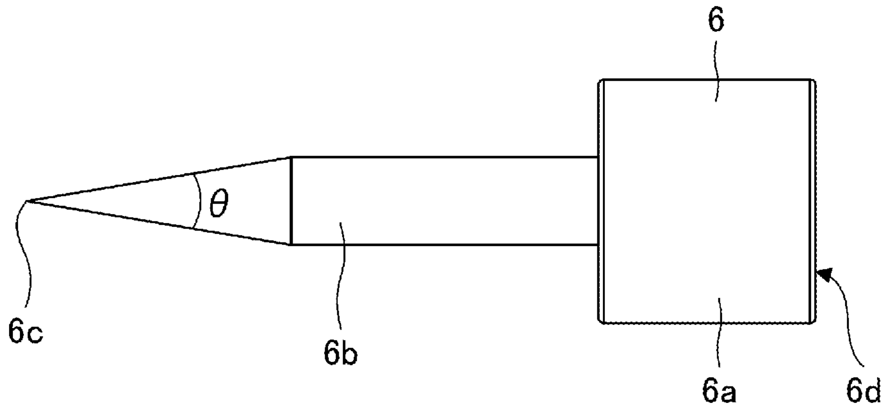
FIG. 19 is a side view illustrating the discharge electrode 6 viewed in the Y-axis direction.

FIG. 18 is a perspective view illustrating the discharge electrode 6. FIG. 19 is a side view of the discharge electrode 6 viewed in the Y-axis direction. The material of the discharge electrode 6 is, for example, SUS430. The material of the discharge electrode 6 is not limited to SUS430, and may be SUS303, SUS304, or the above-described aluminum alloy, copper alloy, cast iron, steel, iron alloy, or the like.

The discharge electrode 6 includes a pedestal 6*a* and a discharge needle 6*b*.

The pedestal 6*a* is a cylindrical member having an end face 6*d* formed flat to be brought into contact with the insulation plate 3. The discharge needle 6*b* is provided on an end face of the pedestal 6*a* opposite to the end face 6*d*. The discharge needle 6*b* extends from the pedestal 6*a* in the positive Z-axis direction, and an end portion 6*c* thereof is positioned to face the through hole 4*a* of the discharge plate 4. A region near the end portion 6*c* of the discharge needle 6*b* has a tapered shape, and the inclination angle θ of the area with the end portion 6*c* at the apex is preferably 15° to 25°, and is, for example, 20°.

Figure 20:
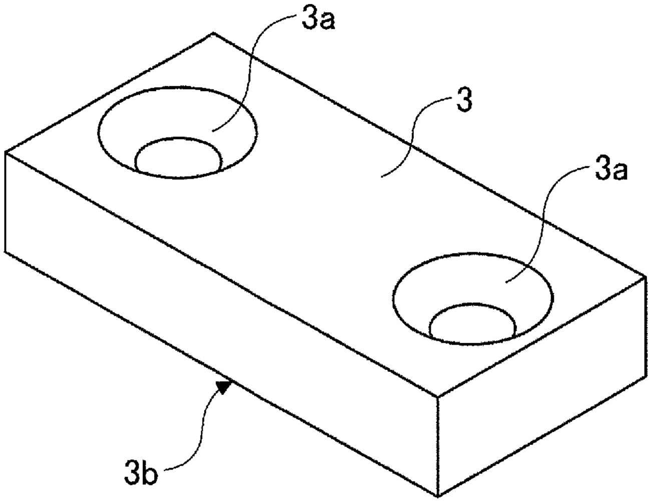
FIG. 20 is a perspective view illustrating an insulation plate 3.
Figure 21:
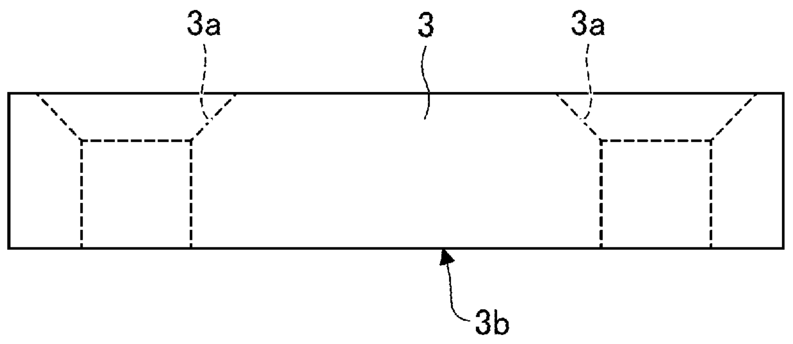
FIG. 21 is a side view illustrating the insulation plate 3 viewed in a positive X-axis direction.

FIG. 20 is a perspective view illustrating the insulation plate 3. FIG. 21 is a side view of the insulation plate 3 viewed in the positive X-axis direction. The material of the insulation plate 3 is, for example, PTFE. The material of the insulation plate 3 is not limited to PTFE, and may be, for example, a fluorine-based binder such as PVDF, EPBR, SBR, or CMC. One type of the material may be used alone, or two or more types of the materials may be used in combination.

In the insulation plate 3, two through holes 3_a_ penetrating through the insulation plate 3 in the Z-axis direction. The insulation plate 3 is secured to the insulation plate 2 by inserting the screws 16 shown in FIG. 8 into the two through holes 3_a_ so that the end face 3_b_ of the insulation plate 3 in the positive Z-axis direction is brought into contact with the pedestal 6_a_ of the discharge electrode 6, and screwing the screws 16 into the insulation plate 2.

Referring back to FIG. 8, the frame 8 includes a locking block 9, a locking block 10, and a positioning pin 11. For the material of the frame 8, a metal such as aluminum (alloy), or stainless steel is preferably used, in order to prevent a leakage of electromagnetic waves caused via a corona discharge. In addition, PMMA (polymethylmethacrylate resin) having a high transparency may be used to facilitate confirming the state of transfer of the ionized substance to the mass spectrometry apparatus 200. Even when such a resin having a high transparency is used, it is preferable to form a transparent conductive film on the surface of the frame from the viewpoint of preventing a leakage of electromagnetic waves. The locking block 9 is screwed to the frame 8 by screws 17. The locking block 10 is a member configuring a hinge structure which is screwed to the frame 8 by screws 18. A positioning pin 11 is inserted into the locking block 10 in the Y-axis direction.

Figure 22:
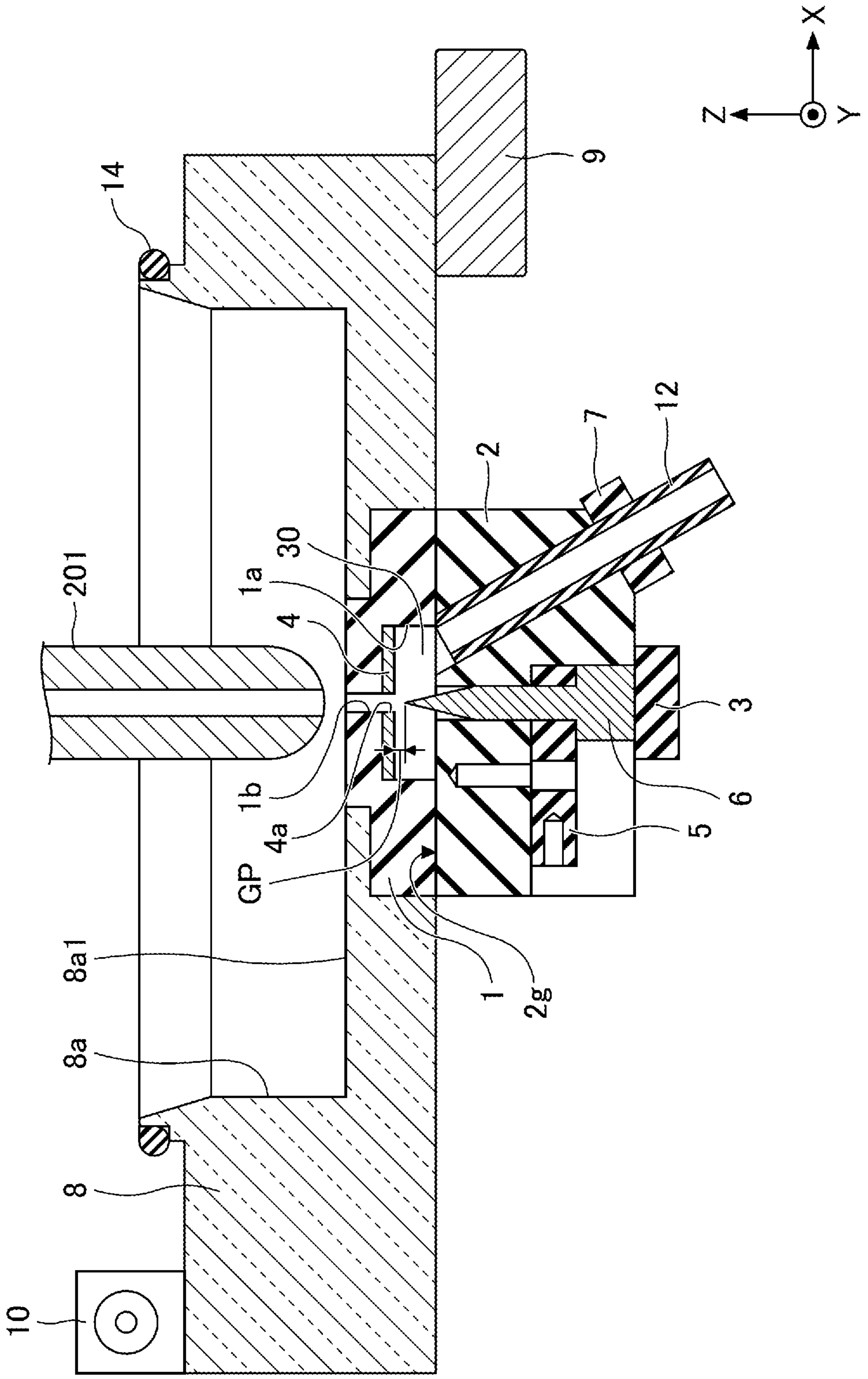
FIG. 22 is a cross-sectional view illustrating the ionization device 300 and the frame 8 shown in FIG. 7 on an XZ plane.

FIG. 22 is a cross-sectional view of the ionization device 300 and the frame 8 in the XZ plane shown in FIG. 7. A space 30 formed within the ionization device 300 is a space that includes an area where the discharge electrode 6 and the discharge plate 4 are opposite to each other. The volume of the space 30 is, for example, 2550 $mm^3$ when the size of the concave portion 1_a_ is 6 mm deep, 17 mm wide, and 25 mm long. However, the volume of the space 30 is not limited thereto, and may be of a volume capable of producing an amount of ionized substance required for analysis by the mass spectrometry apparatus 200, for example, 10 $mm^3$ to 4000 $mm^3$, more preferably 100 $mm^3$ to 3000 $mm^3$, and even more preferably 500 $mm^3$ to 2600 $mm^3$, while ensuring the area where the discharge electrode 6 and the discharge plate 4 are opposite to each other.

As described above, in the present embodiment, the ion formation section can be configured in a small space. One reason for this is that in the discharge plate, which is a discharge electrode, an opening is formed, and the discharge plate has a role (function) of a partition (wall) that constitutes the space. In addition, the hole of the opening (4_a_) of the discharge plate can have a function as a transfer section that transfers an ionized analyte (33_a_) and an end portion (edge) of the opening of the discharge plate and the discharge electrode constitute a pair of electrodes, so that the size of the ionization device can be further reduced.

The "GP" in the figure is the distance between electrodes and the distance between electrodes GP is equal to the shortest distance from the end of the discharge electrode 6 to the discharge plate 4. The concave portion 1_a_ of the insulation plate 1 and the end face 2_g_ of the insulation plate 2 function as a space formation section for forming the space 30. The tube 12 functions as an introduction section for introducing an analyte by the mass spectrometry apparatus 200 into the space 30. The space 30 is a quasi-enclosed space having an inlet port of a substance because the space 30 communicates with the exterior of the insulation plate 1 and the insulation plate 2 through the tube 12. The through hole 4_a_ formed in the discharge plate 4 and the through hole 1_b_ of the insulation plate 1 function as a transfer section for transferring the ionized substance to the mass spectrometry apparatus 200.

Next, an ionization method of a substance by the ionization device 300 will be described.

Figure 23:
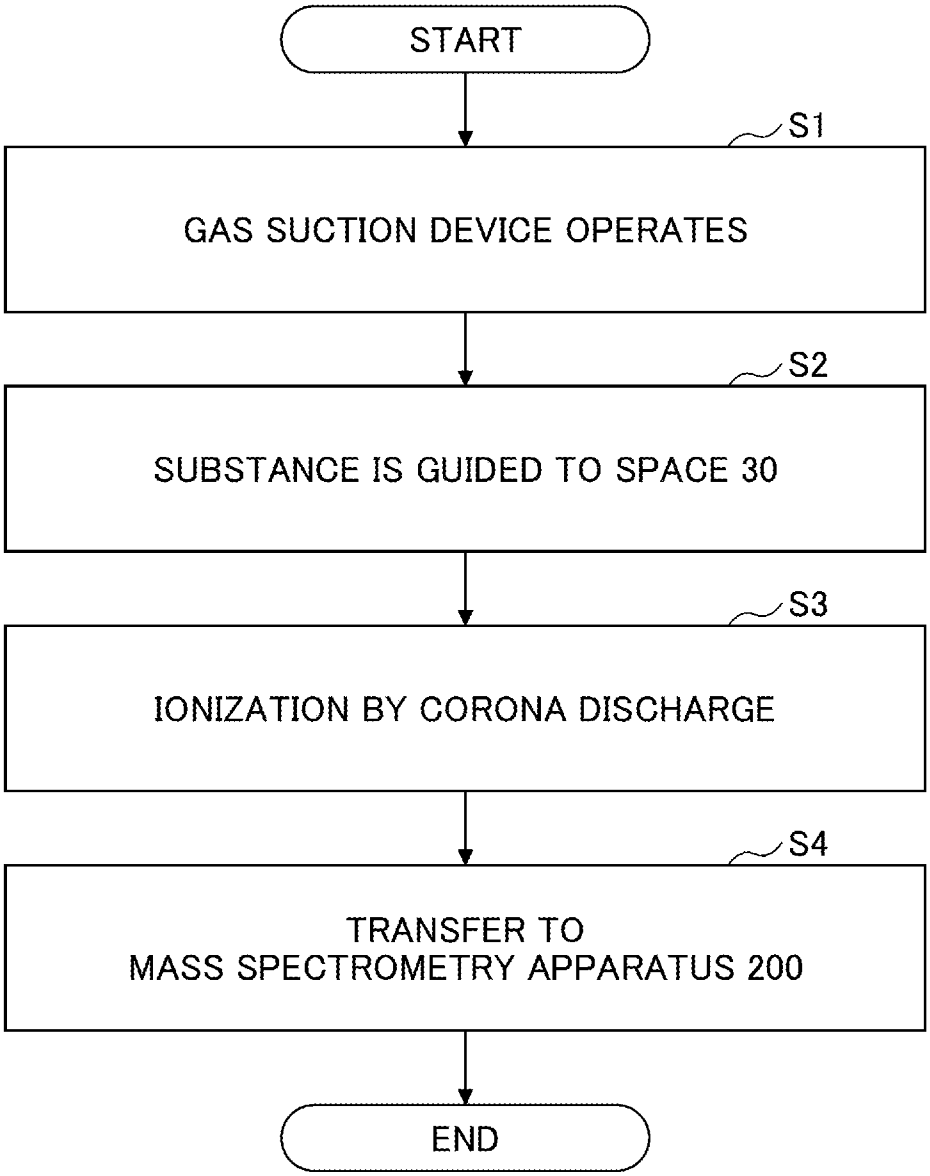
FIG. 23 is a flow chart illustrating a method for ionizing a substance by the mass spectrometry apparatus 200.

FIG. 23 is a flow chart illustrating a method of ionization of a substance by the mass spectrometry apparatus 200.

When the gas suction device 400 is operated (Step S1), a negative pressure is generated in the space (ion formation section) 30. Then, the substance 32 to be analyzed by the mass spectrometry apparatus 200 is introduced into the space 30 including the region 31 (Step S2). Air is also introduced along with the substance 32 that is the sample for the analysis. The gas sucked with the substance 32 may be an inert gas, such as nitrogen, depending on the type of the substance. Since air can be used as the intake gas in the present embodiment, the apparatus is not complicated and operating costs can be reduced.

The substance 32 introduced in the space 30 is ionized via a corona discharge 33 occurring between the discharge electrode 6 and the discharge plate 4 (step S3).

The ionized substance 33_a_, which is a substance ionized in the space 30, is transferred to the mass spectrometry apparatus 200 via the through hole 4_a_ of the discharge plate 4 and the through hole 1_b_ of the insulation plate 1 (Step S4). The principle of transporting the ionized substance 33_a_ to the mass spectrometry apparatus 200 is accomplished by first attracting by a potential difference and then drawing by a differential pressure. With the attraction by the potential difference, the ion intake port 201 is set at a potential opposite to the sign of the charge of the ion of the ionized substance 33_a_, so that a portion of the ionized substance 33_a_ collects around the ion intake port 201. Further, in the drawing by the differential pressure, the mass spectrometry apparatus 200 is provided with a gas suction device (not shown), and when the gas suction device operates (activated), the ionized substance 33_a_ that exists around the ion intake port 201 is taken into the mass spectrometry apparatus 200.

Figure 24:
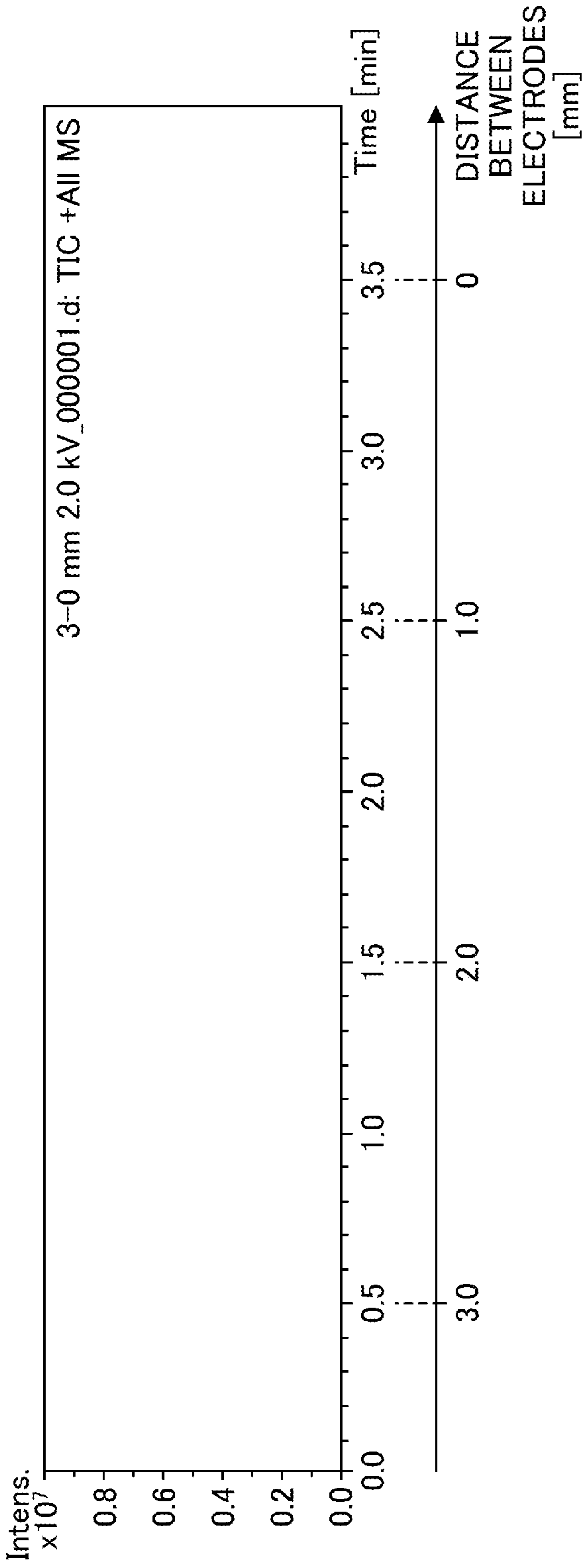
FIG. 24 is a diagram showing a change in an ion detection intensity with respect to a distance between electrodes in a state where a discharge voltage is set to 2.0 kV.
Figure 25:
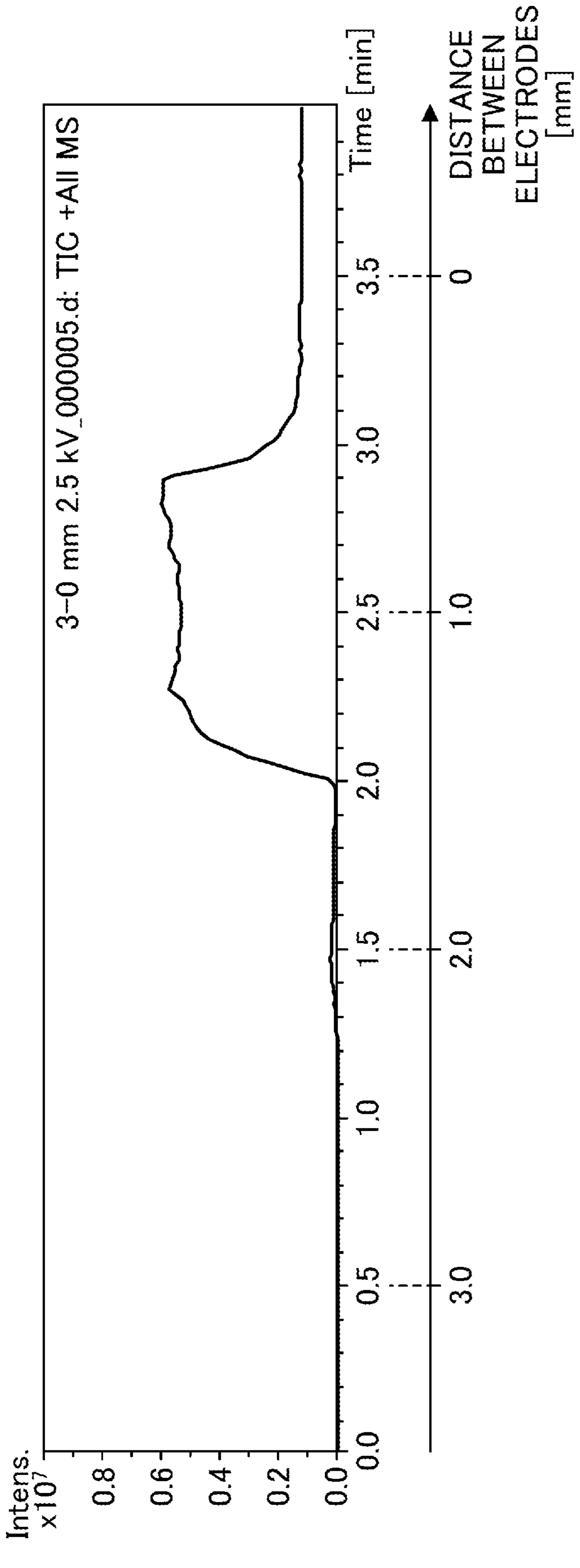
FIG. 25 is a diagram showing a change in the ion detection intensity with respect to the distance between electrodes in a state where the discharge voltage is set to 2.5 kV.
Figure 26:
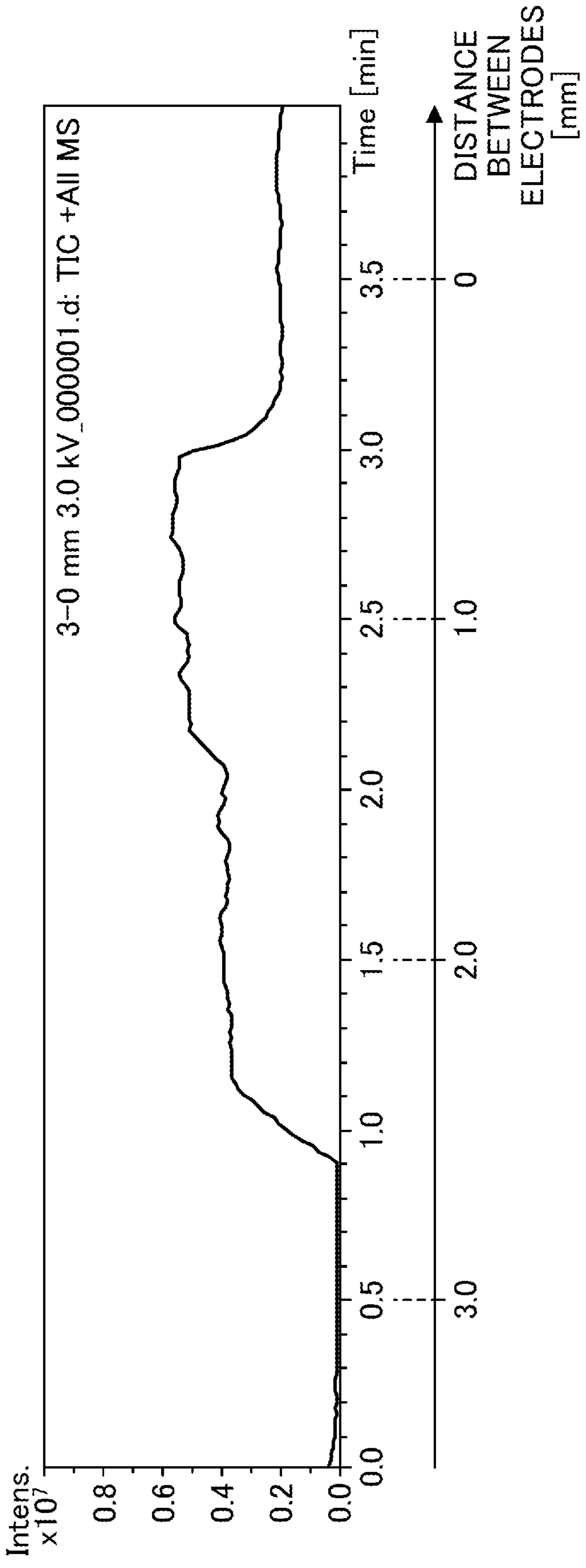
FIG. 26 is a diagram showing a change in the ion detection intensity with respect to the distance between electrodes in a state where the discharge voltage is set to 3.0 kV.

Referring now to FIGS. 24 to 26, an ion detection intensity (in the following, also referred to as "ion intensity") of the mass spectrometry apparatus 200 when the ionization device 300 according to the present embodiment is used will be described.

FIG. 24 is a diagram showing a change in the ion detection intensity with respect to the distance between electrodes with the discharge voltage set to 2.0 kV. FIG. 25 is a diagram showing the change in the ion detection intensity with respect to the distance between electrodes with the discharge voltage set to 2.5 kV. FIG. 26 is a diagram showing the change in the ion detection intensity with respect to the distance between electrodes with the discharge voltage set to 3.0 kV. FIGS. 24 to 26 show results of an experiment in which the ion intensity was measured when the distance between electrodes was shortened at a constant speed from 3 mm to 0 mm. The horizontal axis of each of these figures represents parallel dual axes of the elapsed time (minutes) and the distance between electrodes (mm). The vertical axis of each figure represents the ion intensity at each elapsed time and at each distance between electrodes.

In each of FIGS. 24 to 26, the distance between electrodes is 3.0 mm until 0.5 minutes elapse. After 0.5 minutes, the distance between electrodes is shortened at a constant speed. After 1.5 minutes, the distance between electrodes is 2 mm. After 2.5 minutes, the distance between electrodes is 1 mm. After 3.5 minutes, the distance between electrodes is 0 mm.

As shown in FIG. 24, the ionized substance 33*a* cannot be observed because discharge does not occur when the discharge voltage is 2.0 kV.

On the other hand, as shown in FIGS. 25 and 26, discharge occurs when the discharge voltage is 2.5 kV or more, so that the ionized substance 33*a* is observed.

As shown in FIG. 25, when the discharge voltage is 2.5 kV, the ion intensity begins to increase as the distance between electrodes is shortened to 1.5 mm (2.0 minutes). In the interval of the distance between electrodes of from 1.3 mm to 0.6 mm (2.2 minutes to 2.9 minutes), the ion intensity maintains a first value (about $0.6\times10^7$). As the distance between electrodes is shortened to 0.6 mm or less, the ion intensity begins to decrease from the first value. When the distance between electrodes is less than or equal to 0.4 mm (3.1 minutes), the ion intensity maintains a second value (about $0.2\times10^7$). In other words, when the distance between electrodes is less than 0.5 mm, the ion intensity is relatively low, but can be detected to some extent and can be observed. When the distance between electrodes is within the range from 0.5 mm to 1.5 mm, the ion intensity is relatively high. When the distance between electrodes is 1.5 mm or more, the ion intensity cannot be observed.

As shown in FIG. 26, when the discharge voltage is 3.0 kV, the ion intensity begins to increase as the distance between electrodes is shortened to 2.6 mm (0.9 minutes). The ion intensity maintains a first value (about $0.4\times10^7$) in the interval of the distance between electrodes of from 2.4 mm to 1.3 mm (0.9 minutes to 2.2 minutes). In the interval of the distance between electrodes of from 1.3 mm to 0.5 mm (2.2 minutes to 3.0 minutes), the ion intensity is increased to a second value (about $0.6\times10^7$) to maintain this value. As the distance between electrodes is shortened to 0.5 mm or less, the ion intensity begins to decrease from the second value. When the distance between electrodes is less than or equal to 0.3 mm (3.2 minutes), the ion intensity maintains a third value (about $0.2\times10^7$). In other words, when the distance between electrodes is less than 0.5 mm, the ion intensity is relatively low, but can be detected to some extent and can be observed. When the distance between electrodes is within the range from 0.5 mm to 1.3 mm, the ion intensity becomes the maximum value. When the distance between electrodes is within the range from 1.3 mm to 2.6 mm, the ion intensity is relatively high value but lower than the maximum value. When the distance between electrodes is 2.6 mm or more, the ion intensity cannot be observed.

Comparing the ion detection intensity at the discharge voltage of 2.5 kV with the ion detection intensity at the discharge voltage of 3.0 kV, the ion detection intensity, when the distance between electrodes is 2.0 mm (elapsed time: 1.5 minutes) at 3.0 kV, is found to be higher than that at 2.5 kV. However, the ion detection intensity when the distance between electrodes is about 1.0 mm (elapsed time: about 2.5 minutes) is of the same level for any discharge voltage.

As a result, in the ionization device 300 according to the present embodiment, it is preferable that the discharge voltage be set to 3.0 kV and that the distance between electrodes be set to be from 0.5 mm to 2.4 mm, preferably from 0.5 mm to 1.3 mm, more preferably 0.7 mm to 1.3 mm, and even more preferably 0.9 mm to 1.1 mm. In addition, when the discharge voltage is set to 2.5 kV, the distance between electrodes is preferably set to be from 0.7 mm to 1.3 mm, and more preferably from 0.9 mm to 1.1 mm. However, when the ionization device 300 contacts the ion intake port 201, the distance between electrodes may become shorter due to a position displacement of the discharge plate 4, and a corona discharge cannot be generated. Therefore, in view of the mounting tolerance of the ionization device 300, it is more preferable to set the distance between electrodes to be about 1.5 mm (from 1.3 mm to 1.7 mm). When the voltage is raised too high, the corona discharge may change to an arc discharge, which is not suitable for the ionization. In some cases, sufficient ionization can be confirmed even at the discharge voltage of 2 kV.

Figure 27:
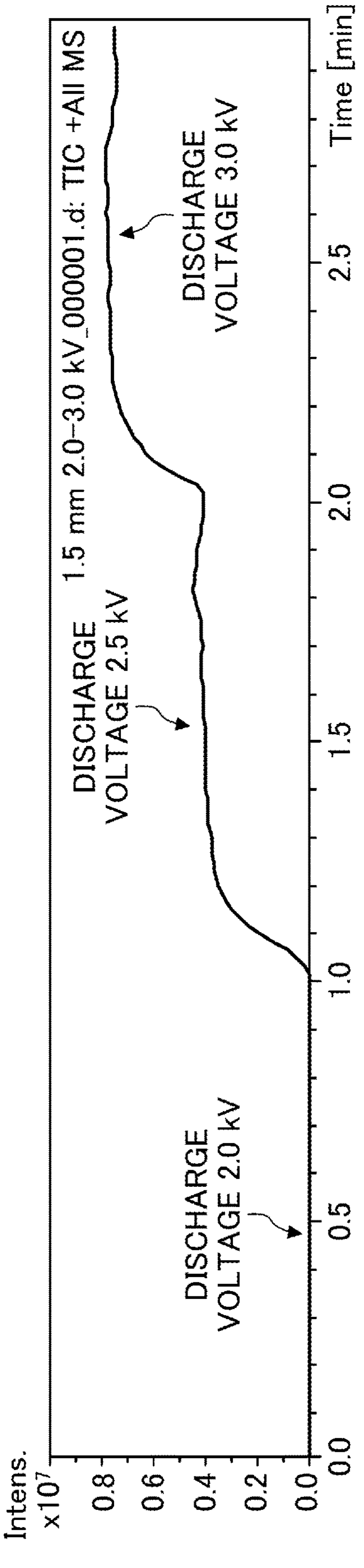
FIG. 27 is a diagram showing a change in the ion detection intensity with respect to the distance between electrodes by the ionization device 300 according to the present embodiment.
Figure 28:
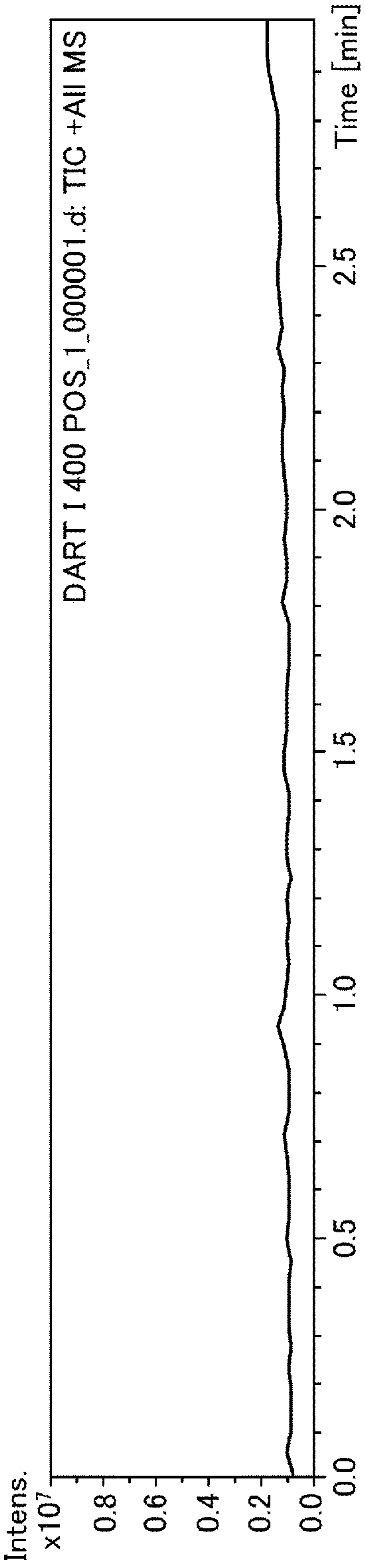
FIG.28 RELATED ART
FIG. 28 is a diagram showing a change in the ion detection intensity with respect to the distance between electrodes according to the related art.

Referring now to FIGS. 27 and 28, a result of comparison of the ionization device 300 according to the present embodiment with the related art will be described.

FIG. 27 is a diagram illustrating a change in the ion detection intensity with respect to the distance between electrodes by the ionization device 300 according to the present embodiment. FIG. 28 is a diagram showing a change in the ion detection intensity with respect to the distance between electrodes according to the related art. FIGS. 27 and 28 show results of an experiment in which the ion intensity was measured when the distance between electrodes was fixed at 1.5 mm and the discharge voltage was changed to 2.0 kV, 2.5 kV, and 3.0 kV, in this order. In this experiment, the discharge voltage was set at 2.0 kV in the interval of from 0 minutes to 1 minute, 2.5 kV in the interval of from 1 minute to 2 minutes, and 3.0 kV in the interval of from 2 minutes to 3 minutes. The horizontal axis of each of these figures represents the elapsed time (minutes), and the vertical axis represents the ion detection intensity.

As shown in FIG. 27, according to the ionization device 300, ions can be detected when the discharge voltage is 2.5 kV or more. On the other hand, in the related art, as shown in FIG. 28, only weak ions can be detected even when the same discharge voltage is applied. FIG. 28 shows a graph at a normal He measurement mode of 400° C. in a conventional ion source, Direct Analysis in Real Time (DART).

Figure 29:
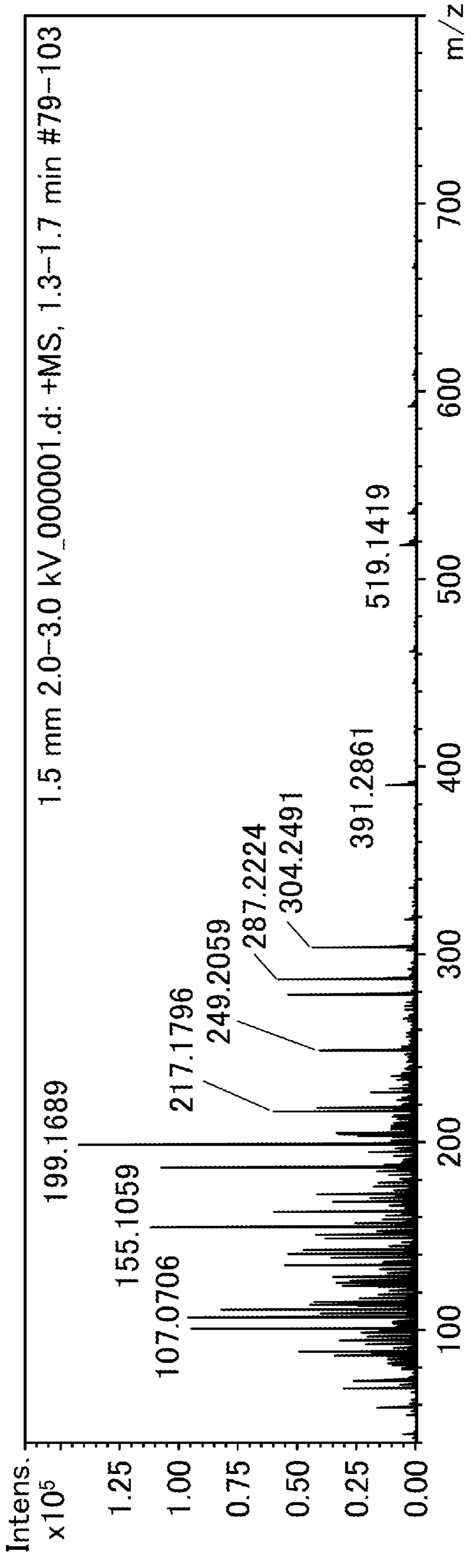
FIG. 29 is a graphical representation of a mass distribution of ions generated by the ionization device 300 according to the present embodiment.

FIG. 29 is a graphical representation of a mass distribution of ions generated by the ionization device 300 in accordance with the present embodiment. FIG. 30 is a graphical representation of the mass distribution of ions generated in the related art. Each of these figures is a graphical representation of m/z of the ion. The horizontal axis of each of these figures represents m/z of the ion. The quantity "m/z" is a "dimensionless quantity" obtained by dividing the mass of the ion by the unified atomic mass unit and then dividing by the number of charges of the ion. m is the mass of the ion in the atomic mass unit u, and z is the number of charges of the ion. The vertical axis represents the intensity of the ions.

When the peaks of the background components observed by the ionization device 300 and in the related art are compared, detected peaks are found to be almost at the same level but intensity ratios are found to be different.

Figure 31:
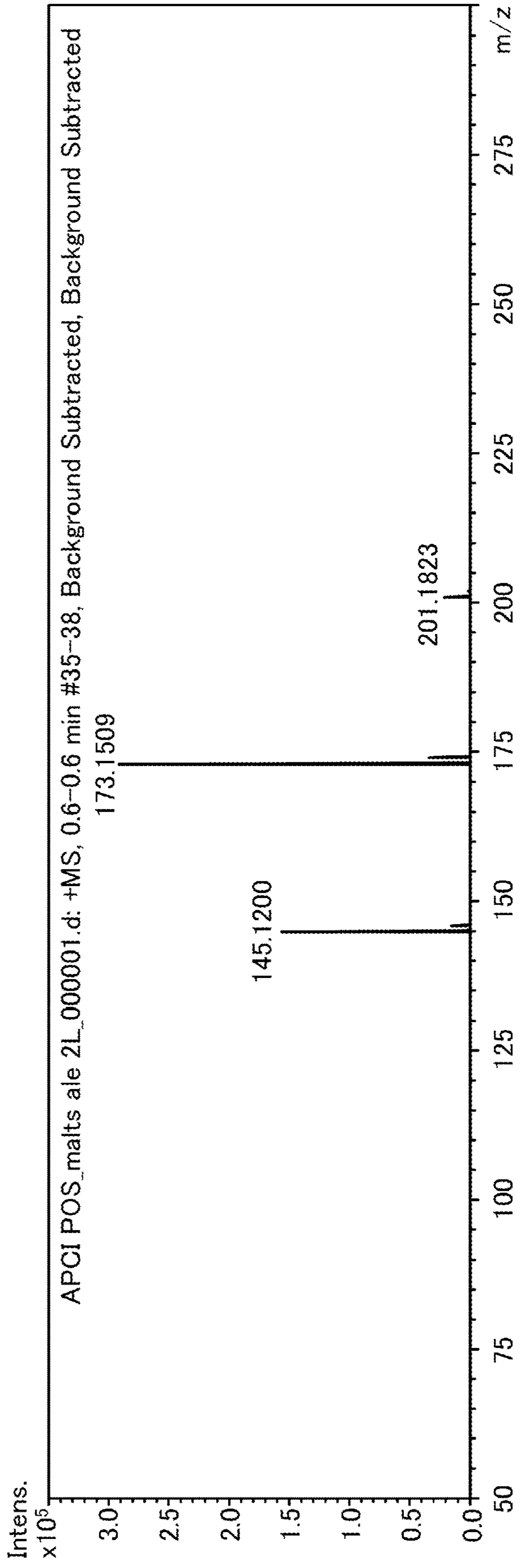
FIG. 31 is a diagram showing a measurement result when a volatile substance generated from a sample (e.g., beer) is ionized using the ionization device 300 according to the present embodiment.
Figure 32:
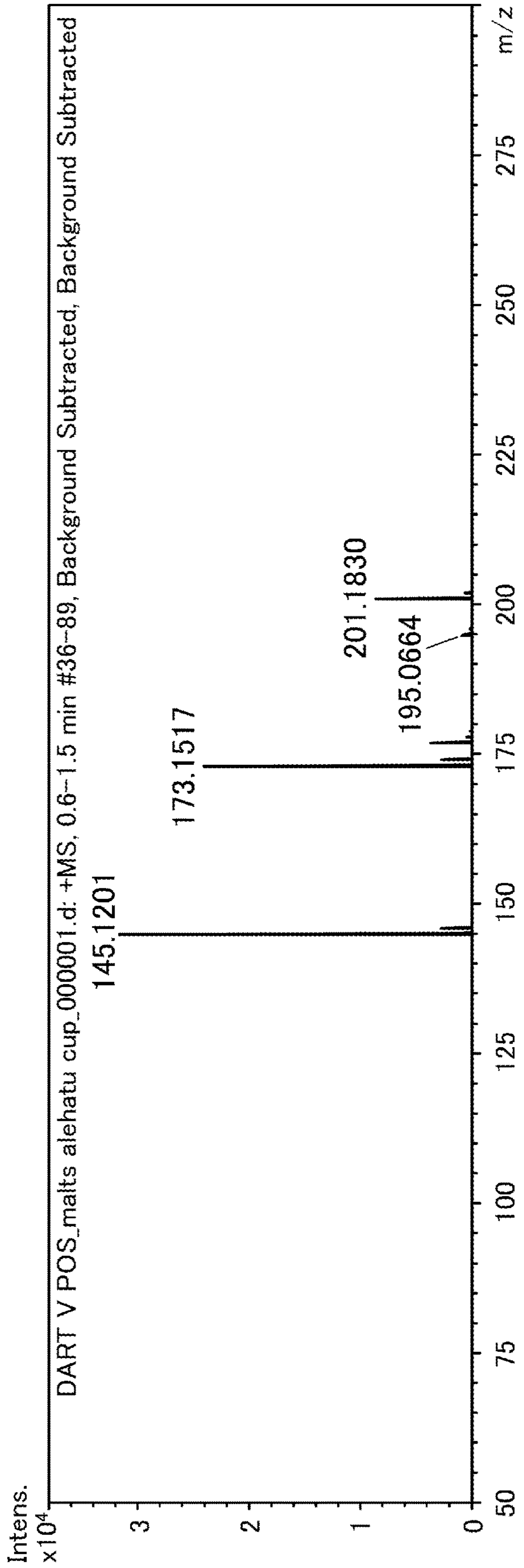
FIG.32 RELATED ART
FIG. 32 is a diagram showing a measurement result when a volatile substance generated from a sample (e.g., beer) is ionized using the related art.

FIG. 31 is a diagram showing a measurement result when a volatile substance generated from a sample (e.g., beer) is ionized using the ionization device 300 according to the present embodiment. FIG. 32 is a diagram showing a measurement result when a volatile substance generated from a sample (e.g., beer) is ionized using the related art. The horizontal axis of each of these figures represents m/z of the ion, and the vertical axis represents the intensity of the ion.

According to FIGS. 31 and 32, the detected components are almost the same, but the ion intensity by the ionization device 300 is approximately 10 times the ion intensity in the related art. This is considered to be mainly due to the fact that the distance from the ionization point of the volatile substance to the ion intake port 201 can be shortened and the diffusion of the ionized substance 33*a* can be suppressed by the space 30. The distance from the ion intake port 201 to the ion generation section (ionization point) is, for example, 5 mm.

FIG. 33 is a diagram illustrating a correspondence relation between the discharge voltage and the distance between electrodes which are set when the ionization process is performed using the ionization device 300 in accordance with the present embodiment.

When the discharge voltage is 2.0 kV, the ionized substance 33*a* cannot be observed regardless of the size of the distance between electrodes because a discharge does not occur.

In the case of the discharge voltage of 2.5 kV, the ionized substance 33*a* can be observed when the distance between electrodes is small (e.g., about from 0.1 to 0.2 mm), when the distance between electrodes is 1 mm, or the like. However, when the distance between electrodes is 2 mm, the ionized substance 33*a* is almost unobservable. When the distance between electrodes is 3 mm, the ionized substance 33*a* cannot be observed.

In the case of the discharge voltage of 3.0 kV, the ionized substance 33*a* can be observed when the distance between electrodes is small (for example, about from 0.1 to 0.2 mm), 1 mm, 2 mm, or the like. However, when the distance between electrodes is 3 mm, the ionized substance 33*a* is almost unobservable.

As described above, according to the ionization device 300 of the present embodiment, an insulation section is provided outside the mass spectrometry apparatus 200, and a corona discharge can be generated in a small space 30 formed in the insulation section. Therefore, diffusion of an ionized substance can be suppressed. Further, the discharge plate 4 is disposed in the insulation plate 1 disposed opposite to the ion intake port 201, so that the region 31 where the discharge electrode 6 and the discharge plate 4 are opposite to each other can be disposed near the ion intake port 201. Therefore, the distance from the region 31 to the ion intake port 201 can be reduced to, for example, a few millimeters. Thus, according to the ionization device 300, a sample to be ionized can be ionized without being diffused, and the ionized sample can be sent rapidly to the mass spectrometry apparatus 200. That is, a highly concentrated ionized substance 33*a*, diffusion of which to the outside (open space) of the insulation section is suppressed, can be rapidly transferred to the ion intake port 201 while suppressing the decrease in concentration. As a result, the responsiveness of analysis and the sensitivity of analysis of the mass spectrometry apparatus 200 are substantially improved.

Further, since the discharge plate 4 disposed in the insulation plate 1 is grounded, it is possible to prevent the mass spectrometry apparatus 200 from detecting an abnormal voltage to stop its operation.

Further, since the discharge plate 4 is disposed in the concave portion 1*a* formed in the insulation plate 1, the distance from the region 31 where the discharge electrode 6 and the discharge plate 4 are opposed to each other to the ion intake port 201 can be further reduced. Accordingly, it is possible to further suppress the decrease in the concentration of the substance that can be transferred to the mass spectrometry apparatus 200 while ensuring electrical insulation with the mass spectrometry apparatus 200. As a result, the responsiveness of analysis and the sensitivity of analysis of the mass spectrometry apparatus 200 are further improved compared to the case where the insulation plate 1 is not provided with the concave portion 1*a*.

Furthermore, since the discharge plate (ground potential electrode) 4 is provided immediately before the ion intake port 201 of the mass spectrometry apparatus, even if an arc discharge occurs between electrodes due to over-voltage application, for example, no current flows through the mass spectrometry apparatus itself. Therefore, it does not lead to failure of the mass spectrometry apparatus, and safety can be ensured. In addition, depending on the mass spectrometry apparatus, the ion intake portion (ion intake port) may be retained at a high voltage, and voltage adjustment of the ion source itself may be required. However, the ion source according to the present embodiment does not require the voltage adjustment in relation to a mass spectrometry layer.

Further, in the ionization device 300 according to the present embodiment, air is introduced into the space 30 together with the substance 32 serving as a sample for analysis, without using a carrier gas (an inert gas such as helium) as in the related art, so that the ionized substance 33*a* can be easily obtained.

The above-described configuration also facilitates the management of the sampling amount (suction amount) into the space 30 and facilitates the analysis by the mass spectrometry apparatus 200.

According to the above-described configuration, an ionized substance can be easily formed even under a normal temperature and/or an atmospheric pressure. In the related art, for example, a heater is provided to prevent the ionized substance from adhering to a Ni capillary of the ion source cell. On the other hand, the ionization device 300 according to the present embodiment does not require a heater. As a result, the configuration of the mass spectrometry system 100 can be simplified to improve the reliability of the system and reduce the cost of constructing the system.

According to the above-described configuration, a sample can be directly analyzed, without spraying the sample as in the related art.

In the present embodiment, the corona discharge by the DC power supply 700 (DC corona discharge) is performed. However, a corona discharge by the AC power supply (AC corona discharge) may be performed instead of the DC power supply 700. When the DC power supply 700 is used, the power supply of the mass spectrometry apparatus 200 can be shared, and the configuration of mass spectrometry system 100 is simplified, thereby the reliability of the system is improved, and the cost of the system construction is reduced. In addition, when the AC power supply is used, an effect, such that depending on the ionized substance the substance is more visible with the AC, is obtained.

The ionization method according to the present embodiment includes introducing an analyte by a mass spectrometry apparatus into a space, formed by a first insulation section and a second insulation section, provided between the first insulation section and the mass spectrometry apparatus, and including an area where a first electrode provided in the first insulation section and a second electrode provided in the second insulation section are opposite to each other; and ionizing the introduced substance in the space via a corona discharge generated between the first electrode and the second electrode.

The configuration shown in the above-described embodiment is an example of the contents of the present disclosure, and may be combined with another known art. Also, a part of the configuration may be omitted or changed without departing from the gist of the present disclosure.

What is claimed is:

1. An ionization device comprising:

an ion formation section configured to ionize an analyte via a corona discharge; and a transfer section configured to transfer an ionized analyte to a mass spectrometry apparatus;

wherein the ion formation section and the transfer section are partitioned by one electrode of a pair of electrodes that generate the corona discharge, the one electrode having an opening;

wherein the ion formation section is defined by a space formed between a recess provided in a first end face of a first insulating plate and a second end face of a second insulating plate;

wherein the first insulating plate and the second insulating plate are fixed together with no gap and without any intervening member between the first insulating plate and the second insulating plate;

wherein a discharge needle of the other electrode is inserted into a through-hole formed in the second end face; and wherein the one electrode is disposed in the recess of the first insulating plate to face the discharge needle at a predetermined distance across the ion formation section.

2. The ionization device according to claim 1, wherein the opening and an ion intake port of the mass spectrometry apparatus for the ionized analyte are disposed on a straight line.

3. The ionization device according to claim 1, wherein a tube configured to supply the analyte has an opening near the corona discharge.

4. A mass spectrometry system comprising:

the ionization device according to claim 1; and the mass spectrometry apparatus.

5. An ionization method for ionizing an analyte, the method comprising:

generating a corona discharge with a pair of electrodes, wherein one of the electrodes has an opening and partitions an ion formation section and a transfer section, wherein the ion formation section is defined by a space formed between a recess provided in a first end face of a first insulating plate and a second end face of a second insulating plate;

wherein the first insulating plate and the second insulating plate are fixed together with no gap and without any intervening member between the first insulating plate and the second insulating plate;

wherein a discharge needle of the other electrode is inserted into a through-hole formed in the second end face; and wherein the one electrode is disposed in the recess of the first insulating plate to face the discharge needle at a predetermined distance across the ion formation section;

supplying an analyte to the vicinity of the corona discharge to ionize the analyte; and transferring the ionized analyte through the opening of the one electrode to a mass spectrometry apparatus.

* * * * *